United States Patent [19]

Sugiura

[11] Patent Number: 5,402,182
[45] Date of Patent: Mar. 28, 1995

[54] AUTOMATIC WHITE-BALANCE CONTROLLING APPARATUS

[75] Inventor: Hiroaki Sugiura, Nagaokakyo, Japan

[73] Assignee: Mitsubishi Denki Kabushiki Kaisha, Tokyo, Japan

[21] Appl. No.: 730,260

[22] Filed: Jul. 15, 1991

[30] Foreign Application Priority Data

| Jul. 17, 1990 | [JP] | Japan | 2-190009 |
| Aug. 17, 1990 | [JP] | Japan | 2-216541 |
| Aug. 27, 1990 | [JP] | Japan | 2-225631 |
| Sep. 27, 1990 | [JP] | Japan | 2-259541 |
| Sep. 27, 1990 | [JP] | Japan | 2-259686 |
| Nov. 13, 1990 | [JP] | Japan | 2-307819 |
| Mar. 13, 1991 | [JP] | Japan | 3-048110 |

[51] Int. Cl.6 .............................. H04N 9/73
[52] U.S. Cl. ........................................ 348/655
[58] Field of Search ............... 358/27, 28, 29; 348/655, 656, 657, 645

[56] References Cited

U.S. PATENT DOCUMENTS

| 3,761,203 | 9/1973 | Neidhardt et al. |
| 3,849,024 | 11/1974 | Masai et al. |
| 3,891,355 | 6/1975 | Hecht et al. |
| 4,506,290 | 3/1985 | Hashimoto . |
| 4,727,413 | 2/1988 | Miura et al. |
| 4,750,032 | 6/1988 | Nakayama ................ 358/29 |
| 4,797,733 | 1/1989 | Takagi et al. ............. 358/29 |
| 4,814,864 | 3/1989 | Pritchard . |
| 4,883,360 | 11/1989 | Kawada et al. ........... 356/402 |
| 4,922,330 | 5/1990 | Saito ......................... 358/29 C |
| 4,947,242 | 8/1990 | Hieda . |
| 5,021,875 | 6/1991 | Iida et al. |
| 5,023,704 | 6/1991 | Hieda ........................ 358/29 C |

FOREIGN PATENT DOCUMENTS

| 0224904 | 6/1987 | European Pat. Off. |
| 2117929 | 4/1971 | Germany . |
| 2228326 | 12/1973 | Germany . |
| 2331614 | 1/1974 | Germany . |
| 2244933 | 3/1974 | Germany . |
| 2601172 | 7/1976 | Germany . |
| 3236269 | 4/1983 | Germany . |
| 51-86815 | 6/1976 | Japan . |
| 52-149431 | 12/1977 | Japan . |
| 59-43872 | 10/1984 | Japan . |
| 230230 | 7/1990 | Japan . |
| 1448578 | 9/1976 | United Kingdom . |

Primary Examiner—Tommy P. Chin

[57] ABSTRACT

An automatic white-balance controlling is for controlling the white-balance of an imaged screen, by controlling the color signal level in accordance with an up-down counting result in a microcomputer. A limited area is established within a VB-VR plane, and a level adjusting operation of the color signals corresponding to the area is limited so as to render a stable white-balance adjusted operation. Judged from data in a time series, the accuracy of the white-balance controlling operation can be assured executing somewhat redundant processing.

9 Claims, 27 Drawing Sheets

AUTOMATIC WHITE-BALANCE CONTROLLING APPARATUS

BACKGROUND OF THE INVENTION

1. Field of the Invention

This invention relates to an apparatus for automatically controlling the white-balance of a color video camera.

2. Description of the Related Art

A color imaging system typically comprises a white-balance controlling apparatus for displaying an object on the screen in colors as close as possible to those viewed through the human eye.

A human eye identifies a white color object as it is when the color temperature of light illuminating the object is within a predetermined range, irrespective of the fluctuation. The color of an object captured by the color imaging system, however, originally tends to blue proportionally to the increase of the light color temperature, while it tends to redden proportionally to its decrease. This means that the colors recognized by the color imaging system and by the human eye differ mutually depending on the color temperature of the illumination light.

A white-balance controlling apparatus has been used to adjust such a difference and to give correct levels of both colors. This apparatus acts to correct color data obtained by imaging an object in accordance with the color temperature of an illumination light.

FIG. 24 of the accompanying drawings shows an example of an imaging apparatus such as color video cameras, etc. comprising a predecessor automatic white-balance controlling apparatus, which is a lightly-modified apparatus based on the technical concept disclosed in Japanese Patent Publication No. 43872/1979.

in FIG. 24, the apparatus includes a lens 1, an imaging element 2, and a color separating circuit 3. The lens 1 receives an optical image in a imaging apparatus such as color video camera etc.. The color separating circuit 3 separates the signal obtained by photoelectrical conversion into three color signals of R, G, and B.

These three color signals are supplied to the processing circuit 6 in the following manner respectively: the signal of R (hereinafter called tile R signal, and similarly for the other two signals), through a gain control circuit (hereinafter called as GC); the G signal, directly; the B signal, through GC5. The processing circuit 6 generates a brightness signal (hereinafter referred to as Y signal) and a color difference signal from the R signal, G signal, and B signal. There are two types of color difference signal. These are, R-Y signal representing the level difference between the R signal and the Y signal, and B-Y signal representing the level difference between the B signal and the Y signal. These Y, R-Y, and B-Y signals are encoded by an encoder 7 and output therefrom as a color video signal.

Aforementioned are a composition of signals generally not relevant to the white-balance control, which is performed by adjusting the levels of the R signal and the B signal by GC4 and GC5. GC4 and GC5 are circuits which adjust the level of the R signal or the B signal with a gain variable in accordance with the gain control signal. The gain control signal is generated by the following composition. Namely, the composition hereinafter described performs negative return control for the GC4 and the GC5 on the basis of the detected result of the integrated value of the R-Y signal and the B-Y signal, and is called an automatic white-balance controlling apparatus.

FIG. 24 shows integrator circuits 8 and 9. The integrator circuit 8 integrates R-Y signal while the integrator circuit 9 integrates B-Y signal. The integrated values of the R-Y signal and the B-Y signal obtained in the integrated circuits 8 and 9 respectively are supplied to the non-inverse input terminal of the comparators 10 or 11. The inverse input terminals of the comparators 10 and 11 receives a reference voltage Vref from a reference voltage generator 15. The comparator 10 and 11 compare the integrated values of the R-Y signal and the B-Y signal to the reference voltage Vref and output a signal representing the compared result (hereinafter, the signals output from the comparators 10 and 11 are called RchCOMP and BchCOMP respectively).

RchCOMP and BchCOMP are supplied to the microcomputer 12, which generates Rch0UT and Bch0UT based on RchCOMP and BchCOMP and outputs them in accordance with the clock pulse. Rch0UT and Bch0UT correspond to either the R signal or the B signal of the gain control signal, and are generated in accordance with a predetermined algorithm. The microcomputer 12 outputs one coupled is a D/A converters 13 and 14, where the former and the latter convert respectively Rch0UT and Bch0UT into analog gain controlling signal. A gain controlling signal for Rch0UT is supplied to GC4 for controlling the R signal level, while a gain controlling signal for Bch0UT is supplied to GC5 for controlling the B signal level. However, GC4 and GC5 increasingly changes the gains for the values of the gain controlling signals linearly.

This control is performed such that the R-Y signal and the B-Y signal become zero when an achromatic color is imaged. The reason why such a control is possible is that; when a scene is imaged, if the R-Y signal in respect of the entire scene is integrated, the conditions become the same as in the case when an achromatic color is imaged, and if the B-Y signal in respect of the entire scene is integrated, the conditions again become the same as in the case when an achromatic color is imaged. Such adjustment would assure a certain white balance irrespective of the change of the light source for illuminating the object.

Comprising such a composition, the operation of an automatic white-balance controlling apparatus has been dependent on the operation of the microcomputer 12. FIG. 25 shows an example of the operation of the microcomputer 12.

As shown in FIG. 25, immediately after the starting of the operation, the initializations of Rch0UT, BchOUT, RchUDC, BchUDC are carried out (S1). These RchUDC and BchUDC are original values for RchOUT and Bch0UT respectively, and can be obtained by the following reversible calculation. Upon completion of the step S1, a calculation loop is entered as shown in the drawing.

In this loop, firstly it is judged whether the H value or the L value should be selected from the comparing circuit 10 (S2). The case where RchCOMP from the comparing circuit 10 is the H value represents that the integrated value of R-Y signal is above the reference value Vref. The reference value Vref is set in accordance with the value of the color difference signal (near the 0V). Therefore, the case where RchCOMP from the comparing circuit 10 is the H value results from the average value of the R-Y signal for one screen being higher than the average value of R-Y signal in the case where an achromatic (white) color object is imaged. Meanwhile, on the contrary, the case where RchCOMP from the comparing circuit 10 is the L value results from the average value of the R-Y signal for one screen being lower than an average value of R-Y signal in the case where an achromatic (white) color object is imaged. After step S2, a decrement of RchUDC is executed when it is H value (S3), while RchUDC increment is executed when it is the L value (S4).

Next, it is judged whether the H or L value is selected from the comparing circuit 11 (S5). In the same manner as step S2, the case where BchCOMP from the comparing circuit 11 is the H value results from the average voltage of B-Y signal for one screen being higher than the average voltage of B-Y signal of the case where an achromatic (white) object is imaged. On the contrary, the case where BchCOMP from the comparing circuit 11 is the L value results from the average voltage of B-Y signal for one screen being lower than the average voltage of B-Y signal of the case where an achromatic (white) object is imaged. In step S5, an increment of BchUDC increment is executed when it is judged as the H value (S6), and a decrement of BchUDC is executed when it is judged as the L value (S7).

Thereafter, RchOUT and BchOUT are output (S8). RchOUT and BchOUT are generated based on the values of RchUDC and BchUDC. Most simply, RchUDC and BchUDC themselves are used as they are. After step S8, clock pulse-input waiting is executed (S9), and the loop returns to step S2 upon receiving the input.

Thus, RchUDC and BchUDC are obtained from the information representing the level of the average voltage for one screen and on the basis of the comparison with the reference voltage Vref. Based on these values for RchUDC and BchUDC, the level adjustment for the R signal and B signal carried out. As a result, it is possible to exercise control such that R-Y signal and B-Y signal are zero when an achromatic object is imaged as mentioned above.

FIG. 26 shows another example of the operation of the microcomputer 12 where RchUDC and BchUDC are dealt as RchOUT and BchOUT respectively. Accordingly, unlike the case shown in FIG. 25, no initialization of RchOUT and BchOUT is performed in step S1', while RchUDC and BchUDC are output in step S8' after step S9.

FIG. 27 shows another example of an imaging apparatus for a color video camera etc.. This apparatus also comprises a similar conventional automatic white-balance controlling apparatus but different in having a automatic gain controller 116 between the imaging element 102 and the color separating circuit 103. In this composition, it is possible to stabilize the white-balance adjustment by controlling the input level of the color separating circuit 103.

However, several disadvantages have arisen in such conventional automatic white-balance controlling apparatus.

Firstly, when green colored objects occupy a majority of the visual imaging field and therefore green is the major color in the screen, the GC for the R signal and the GC for the B signal cause the GC circuits to enter an excessively gained state. In consequence, the image of a white object, which should be seen in white color in the screen, would be colored in magenta. Namely, the white-balance breakes, thereby for example the blue sky would appear inclined to white, and the skin of a Japanese would appear white.

Secondly, the output value of the comparing circuit would be unstable, if noise were introduced to its input. Namely, the white-balance oscillates.

Thirdly, the white-balance tends to be unstable when there is too short a distance to the object. When the distance to the object is long, the objects can usually be within the visual field. Therefore, the integration of the color difference signal can be executed based on the many objects, providing stable white-balance control. However, when the distance to the object is short, the number of objects that fall within the visual field becomes too small, namely only one or the like, thereby the polarity of the output of the comparing circuit tends to reverse. As a result, the white-balance control tends to be unstable.

Fourthly, with the use of a zooming lens if the zooming ratio is on the tele-side, the white-balance control would tend to be unstable. This is because; when the zooming ratio is on the wide side and a number of objects can be within the visual field, the integration of the color difference signal can be executed on the basis of the various objects. However, in this case the number of objects to be within the visual field is small, one or the like, thereby the output of the comparing circuit can reverse frequently.

Further, the white-balance would tend to be unstable when the lightness of the object is insufficient. Namely, if the object has sufficient lightness and the level of the signal from the imaging element is large enough to ignore the noise, the white-balance controlling operation would stabilize. But it the lightness is insufficient, the output polarity of the comparing circuit would tend to reverse due to the noise.

SUMMARY OF THE INVENTION

It is therefore the first object of this invention to prevent the divergence of the white-balance control; the second object of this invention is to prevent the vibration generated when controlling the white-balance; the third object of this invention is to cope with the cases when the zooming ratio is on the tele side and when the lightness of the object is insufficient.

To attain such objects, there is, according to this invention, an automatic white-balance controlling apparatus, comprising:

(a) an integrating means for integrating two types of color difference signals in screen units;

(b) a comparing means for comparing each of the integrated values obtained from the integrating means to a reference value representing an achromatic color;

(c) a command means for: repeatedly executing an up-down count for each color difference signal at each screen based on the compared result; establishing a limited area in a two-dimensional space defined to represent the two types of up-down count results in coordinates; overwriting the previous result from the counting operation with the new result of the latest counting operation; commanding the gain based on the up-down counting result; and (d) an adjusting means for adjusting the levels of three color signals forming an image taken in accordance with the ordered gain from the command means.

In such a composition, the up-down counting result does not change on the border or outside of the border of the limiting area. Therefore, the gain commanding operation and the color signal level controlling operation executed on the basis of the up-down counting result are limited by the limiting area.

Accordingly, by setting the limiting area appropriately, the divergence of the white-balance control toward the magenta or green colors can be prevented.

In using such a composition, it is possible to switch the operation in accordance with the selected mode, which first limiting area is contained within the second limiting area to assure the following property to the illuminating light when there is a change of the object. The command means, when the selected mode is the storing mode, executes the up-down counting only when the trigger is generated. Here, the trigger acts to command the maintaining of the controlled white-balance state.

Thus, real-time white-balance controlling in the following mode can be assured, and the vibration and instability of the white-balance in the storing mode can be reduced.

Further, more noise-free and stable white-balance control can be achieved by dealing with the high-frequency component of the brightness signal. For instance, firstly, the high-frequency component of the brightness signal is extracted from the three-color signals by the high-frequency component extracting means. Next, the command means sets a wide limiting area when the amount of the high-frequency component is large and a narrow limiting area when the same is small. This is because, generally, the amount of the high-frequency component is small when the whole screen is in a single color, like a blue sky, while the same is large when the color temperature is high and the whole screen is blue. Thus, a white-balance control in accordance with the color temperature can be realized.

Further, according to the second composition of this invention, an automatic white-balance controlling apparatus comprising:

(a) an integrating means for integrating two types of color difference signals in screen units respectively;

(b) a comparing means for comparing each of the integrated values obtained from the integrating means to a reference value representing an achromatic color;

(c) a command means for: repeatedly executing an up-down count for each color difference signal at each screen based on the compared result; storing the compared result data for several events in time series; judging if the stored result data are completely accorded with each of the color difference signals, and executing the up-down counting until in accordance; and commanding the gain based on the result of the up-down counting; and (d) an adjusting means for adjusting the levels of three color signals forming an image taken in accordance with the ordered gain from the command means.

In such an arrangement, when the up-down counting is performed after comparing the integrated color values, the effects of vibrations hardly affect the gain commanding operation and so the color signal controlling operation, and thus the white-balance control, is stabilized.

In this arrangement, apparatus which can meet a variety of requirements can be realized. For instance, if the distance to the object is detected and the number of time-series storing times is set in accordance with the detected distance, a stable white-balance control can be achieved irrespective of the distance to the object. Further, if the zooming position of the lens is detected and the number of time-series storing times is set in accordance with the detected zooming position, a stable white-balance control can be achieved irrespective of the distance to the object. Furthermore, if the number of time-series storing times is set in accordance with the controlling level of the imaging signal (signal obtained by imaging and being the base for the color signal generation), a stable white-balance control can be achieved irrespective of the lightness of the object. Still further, if the high-frequency component of the brightness signal is extracted from the three-color signals and the number of time-series storing times is set in accordance with the amount of the high-frequency component, a stable white-balance control can be achieved irrespective of the amount of the high-frequency component.

In addition, a significantly vibration-proof apparatus can be realized in application of the second composition. For example, the compared result at the time point preceding the compared result being stored in time-series is stored by the command means. The command means makes judgment after executing the up-down counting. This judgment is whether the compared result being stored in time-series has changed or not in view of the compared result of the preceding time points. If it is changed, the command means increases the number of time-series storing times, while decreases the same if it is not changed. In this manner, the effect of the temporary fluctuation of the color difference signal on the white-balance control is eliminated, thereby preventing the introduction of noises etc..

The above and other objects, features and advantages of the present invention will become clear from the following description of the preferred embodiments thereof, taken in conjunction with the accompanying drawings.

DETAILED DESCRIPTION

Figure 1:
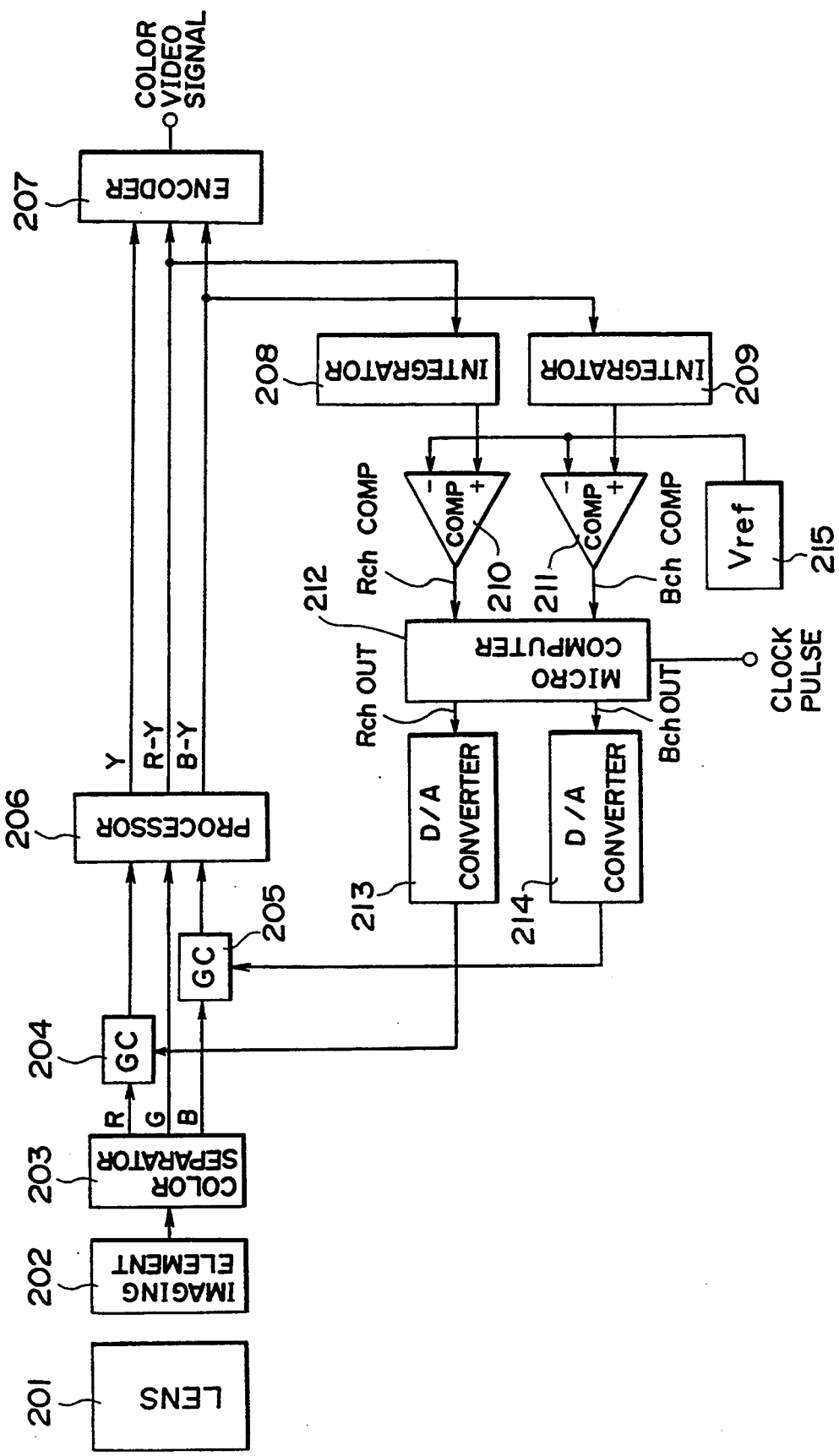
FIG. 1 is a block diagram showing a color imaging apparatus including an automatic white-balance controlling apparatus according to the first embodiment of this invention.

I. First Embodiment:

FIG. 1 shows an example of a color imaging apparatus including an automatic white-balance controlling apparatus according to the first embodiment of this invention.

Firstly, the basic composition of this apparatus will be described. The lens 201, a representative component of the optical system, receives light beams from an imaging object and supplies them to the imaging element 202. The imaging element 202 receives the light beams from the lens 201 (representing the target image and known as a light image), photoelectrically converts and outputs them as an imaging signal. The imaging signal, having a level corresponding to the property of the imaging element 202, is subject to the level control by a not-shown amplifier because of signal weakness, and is then supplied to a color separator 203. The color separator 203 separates three color signals from the imaged signal. These three color signals are referred to as R (red) signal, G (green) signal, and B (blue) signal.

The R, G, and B signals are supplied to a processor 206. The processor 206 generates a brightness signal (Y signal) and color difference signals (R-Y signal and B-Y signal). The Y, R-Y, and B-Y signals are supplied to the encoder 207. The encoder 207 encodes the Y, R-Y, and B-Y signals to provide and output color video signals.

The above-mentioned composition covers all of the functions of the color imaging apparatus except the white-balance controlling operation. The automatic white-balance controlling apparatus in this embodiment comprises integrators 208, 209, comparators 210, 211, microcomputer 212, D/A converters 213, 214, reference voltage generator 215, and GCs (gain controllers) 204, 205.

The integrators 208, 209 integrate the R-Y signal and the B-Y signal respectively for a predetermined period. The comparators 210, 211 compare the integrated result from the integrators 208, 209 respectively with a reference voltage Vref. The reference voltage Vref is supplied from the reference voltage generator 215 to the inversion input terminals of the comparators 210, 211, and its value is equivalent to an integrated value of one screen of R-Y signal or B-Y signal when an achromatic color object is imaged. Since the integrated results of the integrator 208, 209 are supplied to the non-inversion input terminals of the integrators 208, 209 respectively, the outputs of the comparators 210, 211 are H values when the integrated results are higher than the reference voltage Vref and L values when they are lower than the reference voltage Vref.

The microcomputer 212 receives the outputs from the comparing circuits 210, 211 (hereinafter referred to as RchCOMP, BchCOMP respectively), executes up-down counting, and outputs RchOUT, BchOUT in accordance with the clock pulses. These RchOUT, BchOUT are values generated on the basis of the results of the up-down counting (hereinafter referred as RchUDC, BchUDC). RchOUT, BchOUT are then converted into analog gain controlling signals, which are supplied to the GC 204, 205 to set the amplifying gain therein. The GC 204, 205 amplifies the R signal and B signal respectively in accordance with the gains set by the gain controlling signal.

Therefore, the levels of the R signal and B signal are controlled in accordance with the operation of the microcomputer 212, thereby enabling automatic whitebalance control.

Figure 2:
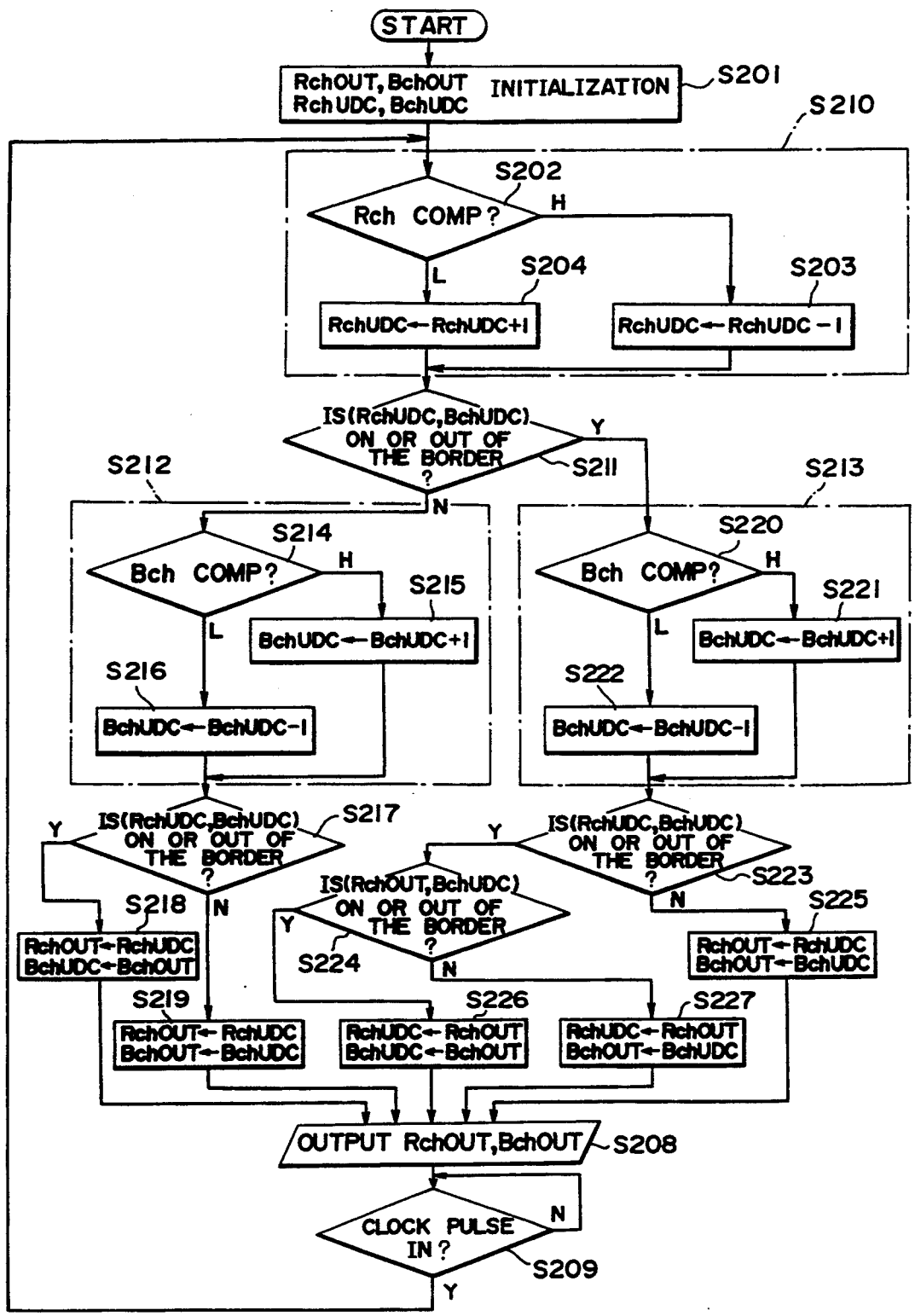
FIG. 2 is a flow diagram showing the operation of the microcomputer in the first embodiment.
Figure 3:
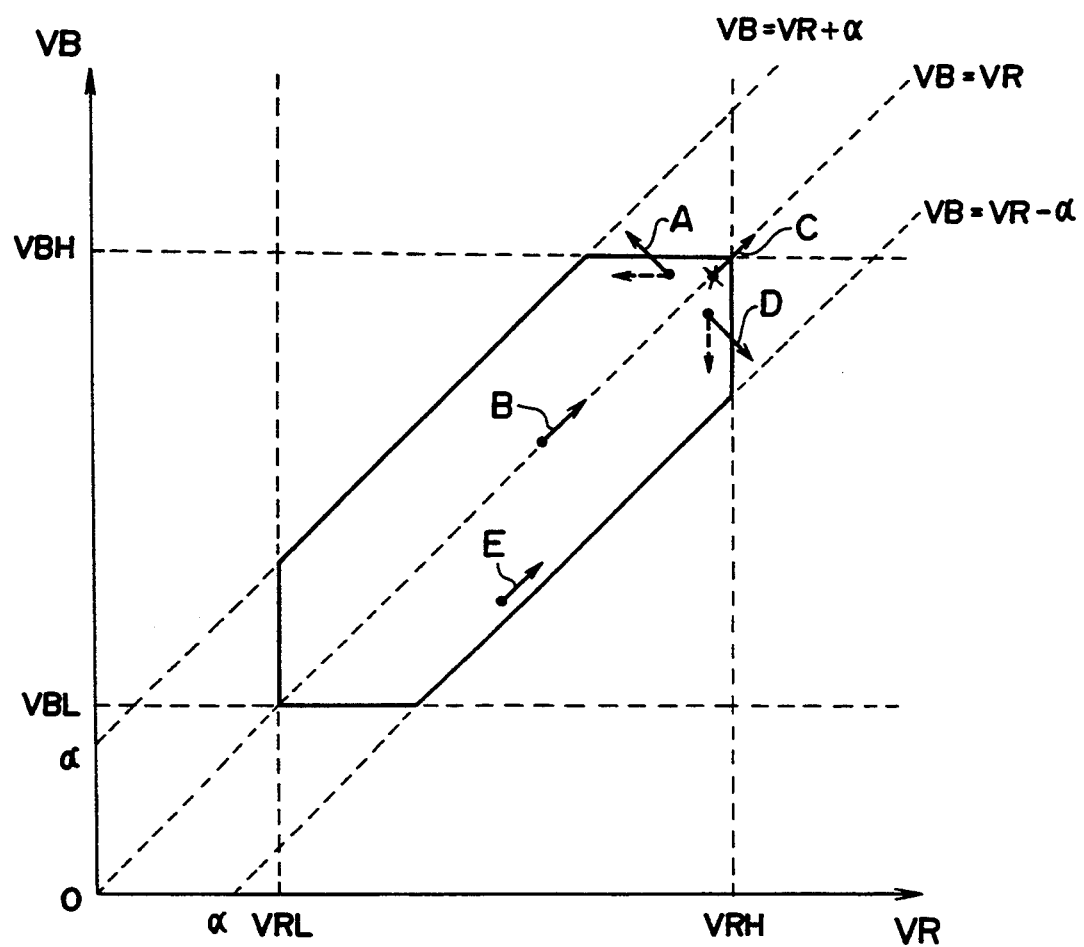
FIG. 3 is a graphic diagram showing VB-VR space in the first embodiment where the limiting area is represented by a hexagon.

Thus, the operation of the microcomputer 212 plays an important role in determining the white-balance controlling operation in this invention. FIG. 2 shows the operation of the microcomputer 212 of this embodiment, while FIG. 3 represents the basic concept embodied by the operation of FIG. 2. The operation of the microcomputer 212 is now described along with the flow diagram of FIG. 2 in view of FIG. 3.

Firstly, the microcomputer 212 initially sets RchOUT, BchOUT, RchUDC and BchOUT (S 201). Thereafter, it returns to the routine operation and does not repeat the operation noted above.

In the normal operation, firstly the step 210 is executed. Step S210 includes Steps S 202-204. The step S 202 judges if RchCOMP value obtained from the comparing circuit 210 is L or H. The step S 203 is executed When the value is judged as being H, while the step S 204 is executed when it is judged as being L. In the step S203 RchUDC is decremented by one, while in the step S204 RchUDC is incremented by one. Namely, in the step S210, the up-down counting is executed in accordance with the value of RchCOMP, and the executed result is stored in RchUDC.

Next, the step S211 is executed. In the step S211, it is judged if the two-dimensional coordinates value (RchUDC, BchUDC) is on the border or outside of the border of the limiting area. Here, the term limiting area signifies a closed area formed above the VB-VR two-dimensional space, which is represented as a hexagonal area in FIG. 3. VB represents the level of the B signal, and VR represents the level of the R signal. These are of the same dimension as RchUDC, BchUDC, RchOUT, and BchOUT.

The limiting area is set by the microcomputer 212. For example, the limiting area showing in FIG. 3 is set as satisfying all of the following conditions:

$VRL \leq VR \leq VRH$ $VBL \leq VB \leq VBH$ $VR - \alpha \leq VB \leq VR + \alpha$ In general, coordinates (VB, VR) of a normal object are located in an area of VB-VR two-dimensional space. The limiting area should be set to have coordinates (VB, VR) of a normal object therein, and to have that outside thereof when a green object different from the normal object occupies a majority of the screen. This is because in the latter case, the coordinates (VB, VR) represent an obviously different position from that in the former case. According to the setting of FIG. 3, it is possible to make a suitable limiting area by adjusting VBR, VBL and.

The judgment of the step S211 is equivalent to judging if the coordinates (RchUDC, BchUDC) pertain to the limiting area upon completion of the up-down counting on the basis of only RchCOMP. Namely, it is a judgment of whether or not the coordinates get out of the limiting area when RchUDC is changed by the up-down counting operation in step S210. If it is judged as not getting out thereof, step S212 is executed, and if it is judged as getting out thereof, step S213 is executed.

The step S212 includes steps S214–S216. In the step S214, it is judged if the value BchCOMP obtained from the comparing circuit 211 is H or L. If the value is H, step S215 is executed. If the value is L, step S216 is executed. In the step S215, BchUDC is incremented by one, while in the step S216, BchUDC is decremented by one. After passing these steps, the sequence is shifted to the operation in step S217. Accordingly, in the step 212 an up-down count is executed on the basis of BchCOMP.

Step S217 is a similar judging step to the step S211. But since the up-down counting based on BchCOMP is already executed in the preceding step S212, the meaning of judgment is different. Namely, the coordinates, (RchUDC, BchUDC) to be judged if they pertain to the limiting area, are the coordinates provided after executing the up-down count based on both RchCOMP and BchCOMP.

In the step S217, when the coordinates (RchUDC, BchUDC) are judged to be on the border or out of the border of the limiting area, step S218 is executed. In the step S218, the contents of RchUDC are substituted for RchOUT, while the contents of BchOUT are substituted for BchUDC. Thereafter, in step S208, RchOUT and BchOUT are output to the D/A converter 213 or 214, and the sequence returns to step S210 thereby the same cycle will be repeated.

In step S217, when the coordinates (RchUDC, BchUDC) are judged not to be on the border or outside of the border of the limiting area, step S219 is executed.

In this step S219, tile contents of RchUDC are substituted for RchOUT, while the contents of BchUDC are substituted for BchOUT. Thereafter, shifting to the step S208 is executed, and the same operation as after step S218 repeated.

On the contrary, in step S211, when the coordinates (RchUDC, BchUDC) are judged to be on the border or outside of the border of the limiting area, the step S213 is executed.

The step S213 includes steps S220–S222 having the same contents as those of steps S214–S216. Namely, the step S213 executes the up-down counting in accordance with the value of BchCOMP, and stores the counted result in BchUDC.

After performing step S213, step S223 is executed. In the same manner as step S217, in step S223, it is judged if the coordinates (RchUDC, BchUDC) after the up-down counting based on both RchCOMP and BchCOMP pertain to the limiting area or not.

After the execution of the step S223, step S224 or S225 is executed. When the judged result in the step S223 is "on or out of the border", it is shifted to the step S224, while if the result is "within the border", it is shifted to the step S225.

In the step S224, it is judged if the coordinates (RchOUT, BchUDC) are on or out of the border or not. If the judged result is affirmative, step S226 is executed, while if the judged result is negative, step S227 is executed. In the step S226 RchOUT is substituted for RchUDC, and BchOUT is substituted for BchUDC. In the step S227, RchOUT is substituted for RchUDC, and BchUDC is substituted for BchOUT. Thereafter, step S208 is executed.

In step S225, RchUDC is substituted for RchOUT, and BchUDC is substituted for BchOUT. Thereafter, step S208 is executed.

The microcomputer 212 performs the above-mentioned operations. Next, prevention of a white-balance deviation effect will be now described in view of a specific embodiment.

Figure 25:
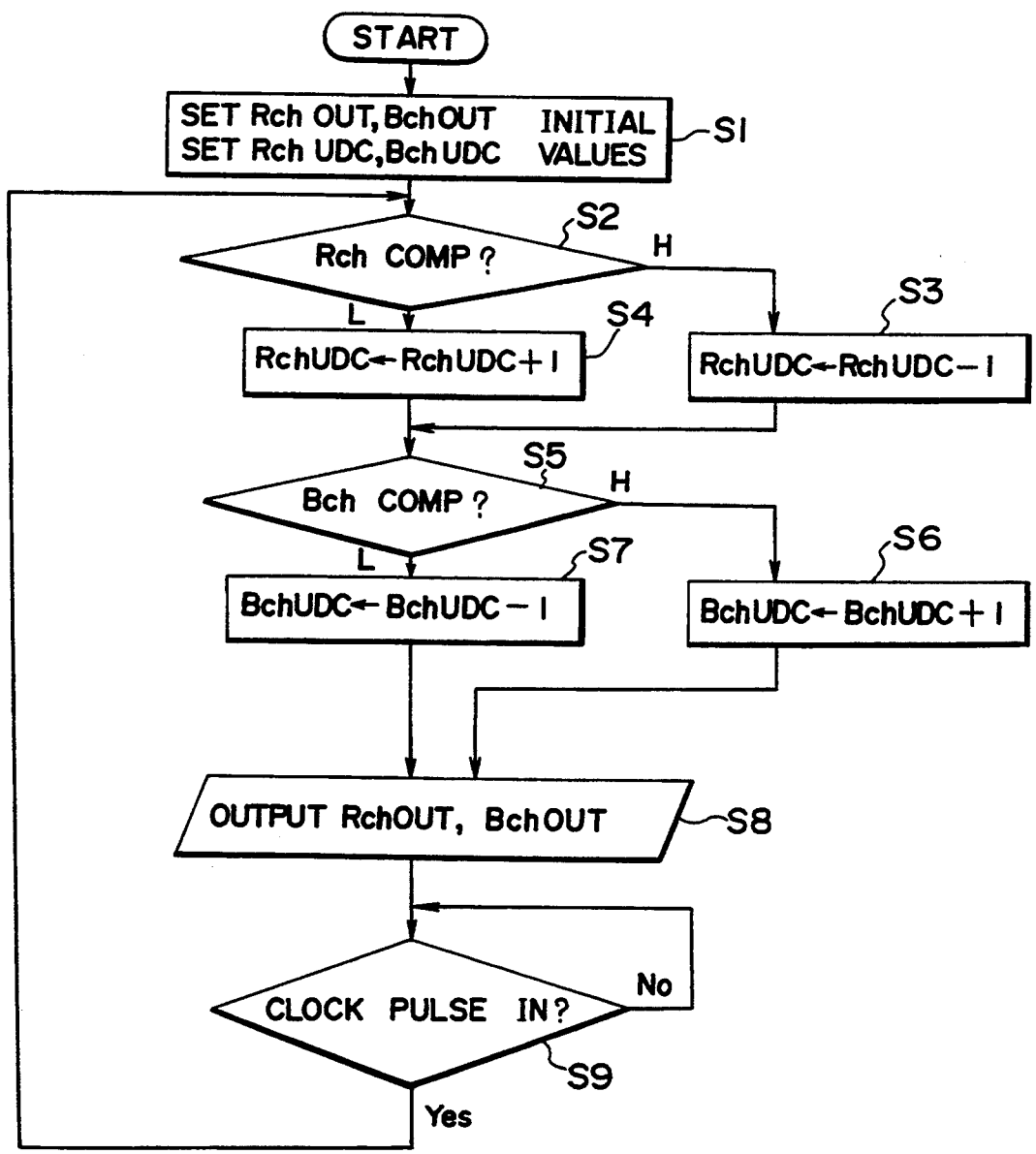
FIG. 25 is a flow diagram showing the operation of the conventional microcomputer in FIG. 24.
Figure 26:
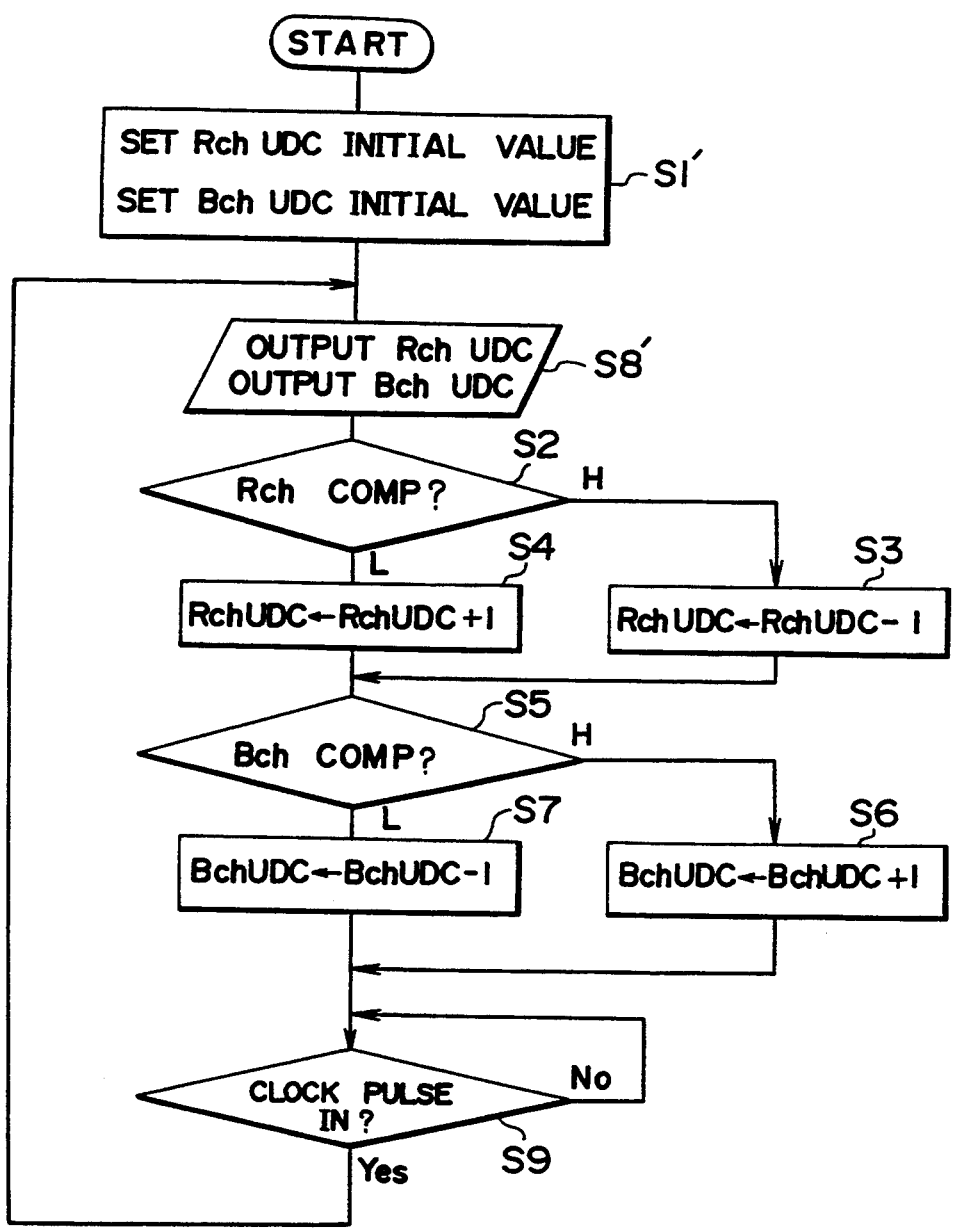
FIG. 26 is a flow diagram showing another operation of the conventional microcomputer in FIG. 25.
Figure 27:
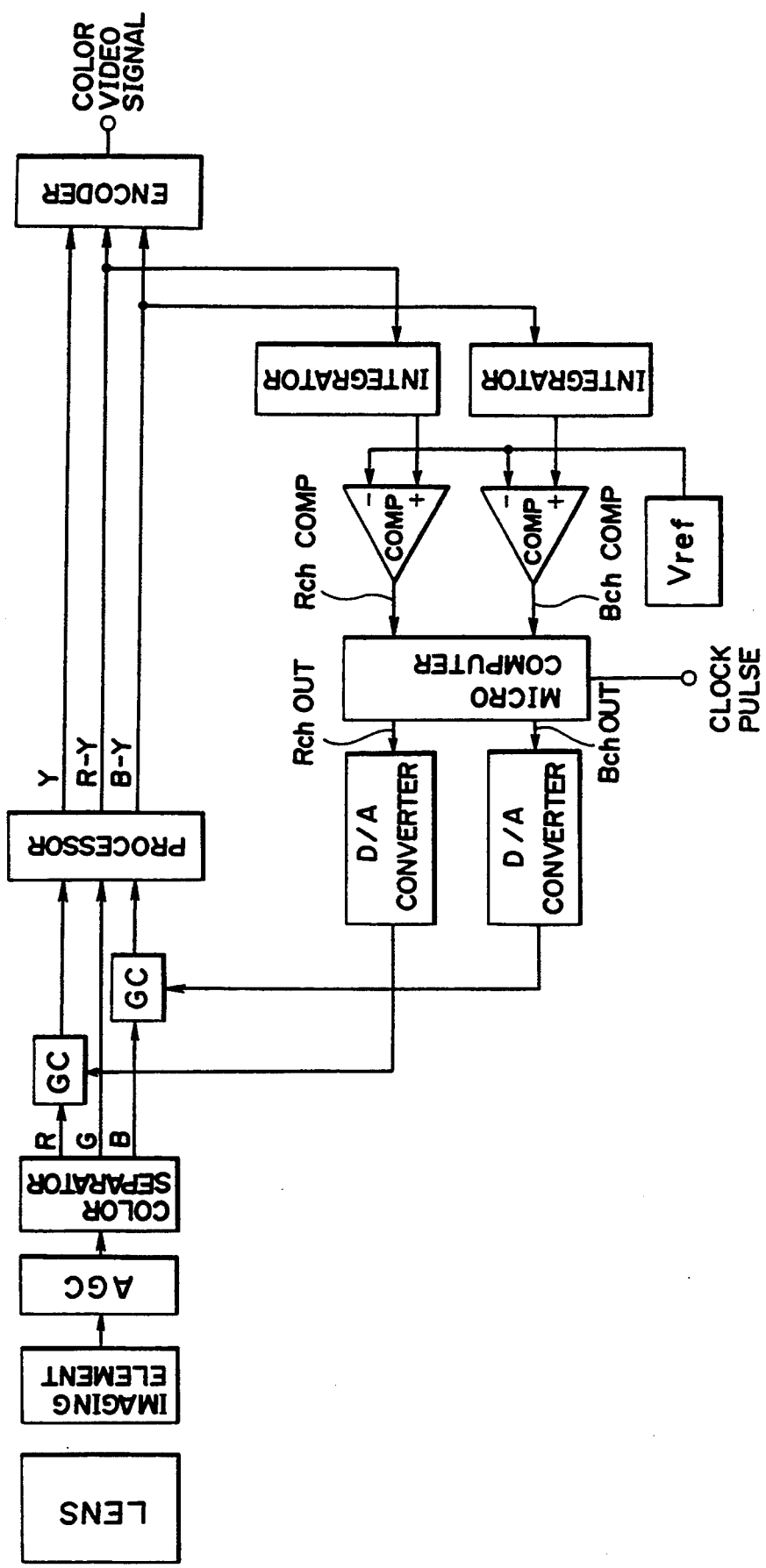
FIG. 27 is a block diagram showing the composition of the apparatus of FIG. 24 to which AGC is added.

Firstly, as a first specific embodiment, a change A shown by a solid line in FIG. 3 will be considered. This change A is based on the assumption of a conventional operation as shown in FIG. 25, and is equivalent to the case where both BchCOMP and RchCOMP are H values. In addition, just before this change A, the coordinates (RchOUT, BchOUT) pertain to the limiting area, and after the change A they come out thereof to the upper side.

In this embodiment, under these circumstances, the change of the coordinates (RchOUT, BchOUT) is not as shown in the solid line, but as shown in a dashed line.

Namely, in such a case, firstly in step S210 the branching to the step S203 and the decrement of RchUDC are executed, and in the step S211 it is judged as not being "on or out of the border". As a result, the step S212 is executed.

In the step S212, when the judgment for BchCOMP is executed (S214), the step S215 for the increment of BchUDC is executed since BchCOMP is H value. In the step 217 which will be executed immediately thereafter, the coordinates (RchUDC, BchUDC) represent a point after a change as shown in the solid line is generated since BchUDC is already increased in the step S210. Accordingly, the coordinates (RchUDC, BchUDC) at this time will be out of the limiting area, thus, the step S218 will be executed.

In the step S218, as mentioned before, the values of RchOUT, BchOUT will be set. In the same manner as imaging a normal object, when the coordinates (RchUDC, BchUDC) before or after the change are both within the limiting area, the coordinates (RchUDC, BchUDC) can be substituted directly to the coordinates (RchOUT, BchOUT) and be output (S208). Namely, since it is necessary to output RchOUT and BchOUT in the step S208, these RchOUT and BchOUT must be set to values reflecting the result of the up-down counting by the step S218 (the same is true in the steps S226, S227, and S225). In this case, however, under the circumstances according to the change A, RchUDC having passed the up-down counting operation in the step S210 is substituted for RchUDC so as to reflecting the result of the up-down counting on the RchOUT. On the contrary, the result of the up-down counting in the step S212 does not reflect on the BchOUT. In other words, no substituting operation for BchOUT is executed. Accordingly, BchOUT output from the microcomputer 212 in the step S208 will be either one of the values having been initially set in the step S201 or the value obtained after executing the operation of the step S208. The substituting operation of BchOUT for BchUDC in the step S218 acts to store the value necessary to execute the steps following to S210 in accordance with the input of the clock pulses.

In this manner, under the circumstances according to the change A, the result of the up-down counting operation reflects only on the RchOUT, and not on the BchOUT. Namely, the calculating operation of the result of the up-down counting for BchOUT is canceled. Accordingly, the change would be as shown in dashed line, thereby assuring the white-balance controlling operation to be carried out within the limiting area. As a result, it is possible to prevent the white object in the screen from being tinged with magenta or green.

As a second specific embodiment, the change B shown in FIG. 3 will now be considered. In this change, the value of RchCOMP is the L while BchCOMP is H. And, even when the result of the up-down counting is reflected on both of RchUDC and BchUDC values, these are held within the limiting area. Under these circumstances, the step S204 is firstly executed in the step S210, the judgment in the step S211 is "within the limiting area", the step S215 is executed in the step S212, and the judgment in the step S217 is "within the limiting area". Accordingly, the step S219 is executed, and any of the up-down counting results of RchUDC and BchUDC would be reflected in RchOUT and BchOUT being the values to be output. As a result, a change as shown in the solid line would occur.

As a third specific embodiment, the change C shown in FIG. 3 will now be considered. In this change, the value of RchCOMP is L while BchCOMP is H. If the result of the up-down counting is reflected in RchOUT and BchOUT being the values to be output, deviations from the limiting area would occur in both of the directions VB, VR. Under these circumstances, the process flow would be as: S202–S204–S211–S220–S221–S223–S224–S226. In consequence, the up-down counting result would not be reflected in the RchOUT and BchOUT being the values to be output. As a result, the same RchOUT and BchOUT as the preceding output values would be also output this time.

As a fourth specific embodiment, the change D shown in FIG. 3 will now be considered. The change D represents the situation where both RchCOMP and BchCOMP are the L values, and where if the result of the up-down counting is reflected in RchOUT and BchOUT being the values to be output, it would be deviated from the limiting area. Under these circumstances, the process flow would be as: S202–S204–S211–S220–S223–S225–S224–S227. Accordingly, the up-down counting result with respect to BchUDC would reflect only in BchOUT among values of RchOUT and BchOUT, while in view of the effect on RchOUT, the up-down counting result with respect to RchUDC is cancelled.

As a fifth specific embodiment, the change E shown FIG. 3 will now be considered. The change E represents a situation where the value of RchCOMP is L while BchCOMP is H, and if the up-down counting result is reflected in RchOUT, BchOUT being the values to be output, it would appear changing within the limiting area. Under these circumstances, the process flow would be as: S202–S204–S211–S220–S221–S223–S225. Accordingly, the up-down counting result would reflect in both RchOUT and BchOUT being the values to be output, while the up-down counting result with respect to RchUDC, BchUDC is not cancelled.

Thus, according to this embodiment, the microcomputer 212 judges whether the coordinates e.g. (RchUDC, BchUDC) pertain to the limiting area or not, and sets the output values RchOUT and BchOUT depending on the judged result. In consequence, any white-balance deviation can be prevented.

It is also possible to compose the microcomputer 212, besides being a single processor, by hard logic such as an up-down counting circuit, etc. Further, the configuration of the limiting area and the setting condition formulas are at the designer's free will, on the condition that there is no possibility of coloring with magenta or green. Specifically, it is preferable to select such configurations as parallelogram, circle, ellipse, etc.. Of course, even if the details in FIG. 2 are different from the shown embodiment, they pertain to the technical scope of this invention.

II. SECOND EMBODIMENT

Figure 4:
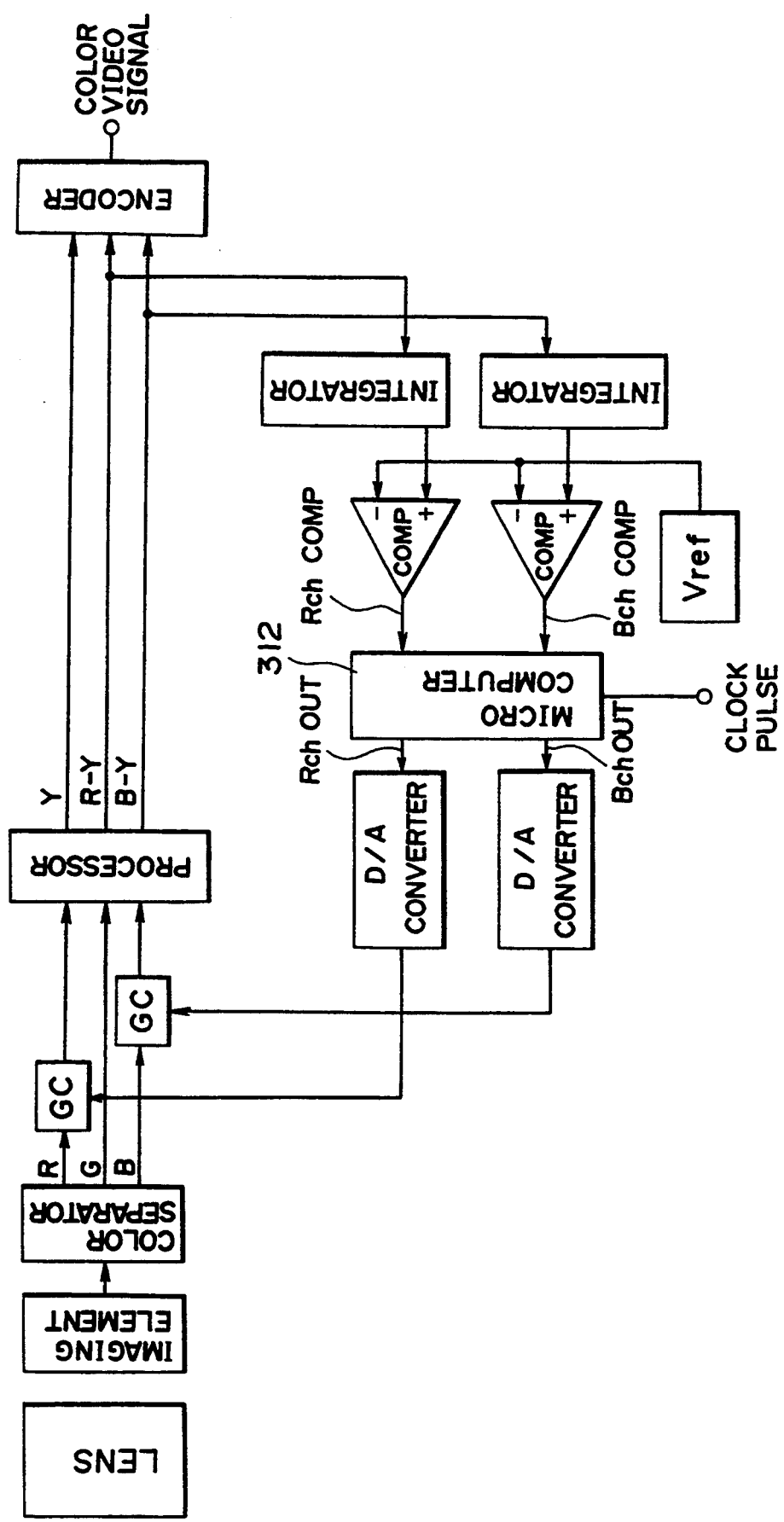
FIG. 4 is a block diagram showing the composition of a color imaging apparatus which includes an automatic white-balance controlling apparatus according to the second embodiment of this invention.

FIG. 4 shows a color imaging apparatus comprising an automatic white-balance controlling circuit according to a second embodiment of this invention. The only difference between this embodiment and the first embodiment lies in the operation and programming of the microcomputer. Namely, the microcomputer 312 of this embodiment performs functions as shown in FIG. 5, not FIG. 2.

Figure 5:
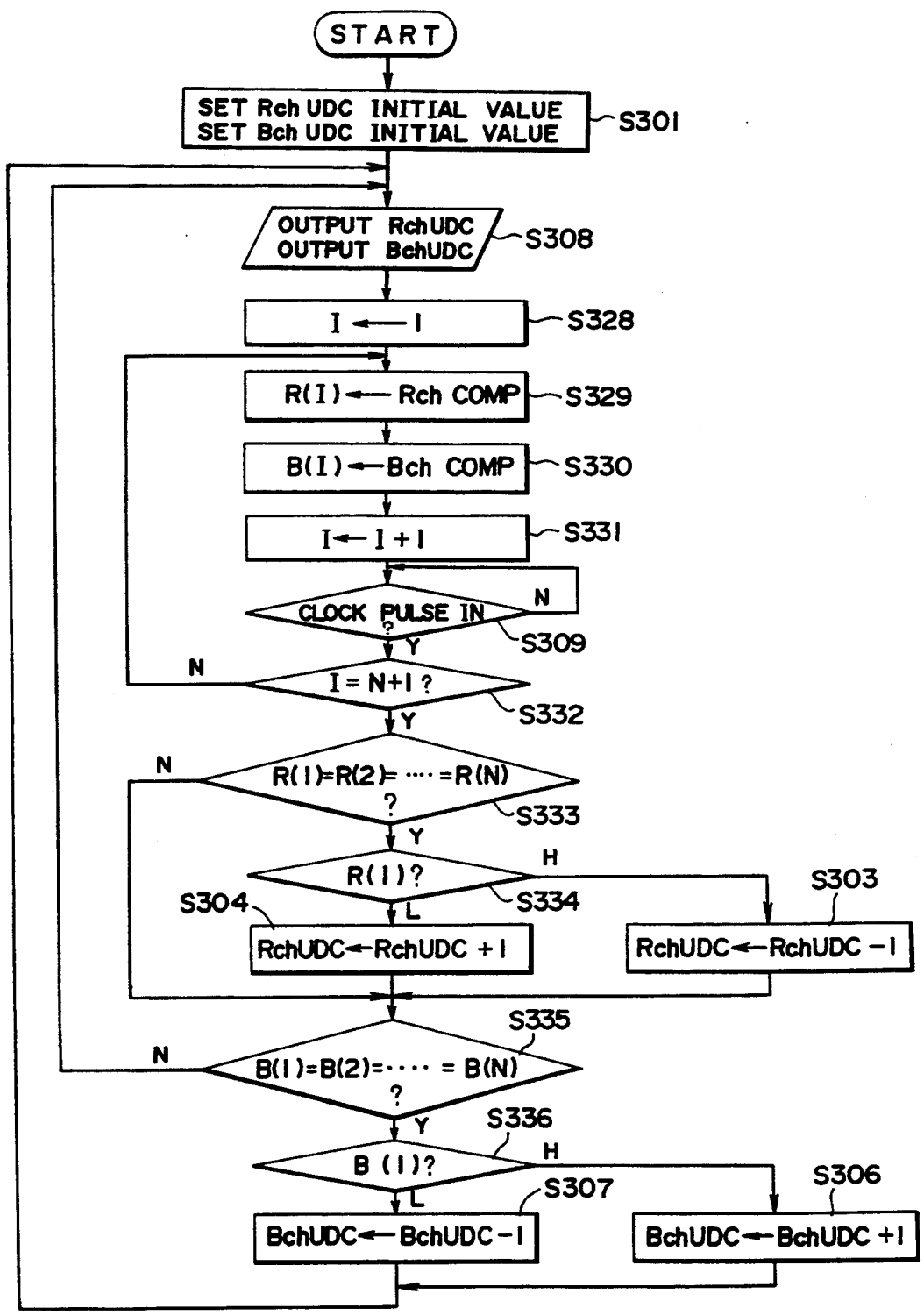
FIG. 5 is a flow diagram showing the operation of the microcomputer according to the second embodiment of this invention.

The operation shown in FIG. 5 starts with an initial setting of RchUDC and BchUDC (S301). Thereafter, the microcomputer 312 shifts to the normal operation and repeats the operation described hereinafter.

In the normal operation, the step S308 is executed. In this step S308, RchUDC and BchUDC are output. Namely, RchUDC and BchUDC are dealt directly as RchOUT and Bch0UT respectively.

After the step S308, the step S328 is executed. In the step S328, the parameter I of the iteration is set to 1. Subsequently, RchCOMP is substituted for the variable R (I) (S329), and BchCOMP is substituted for the variable B (I) (S330). Further, I is increased (S331), and it is judged if a clock pulse is input (S309). Upon input of the clock pulse, the microcomputer 312 judges if I has become N+1 (S332) where N is a predetermined integer. If these conditions are not satisfied, namely if the substitutions of RchCOMP and BchCOMP for the R(I) and B(I) with respect to I being 1-N have not been completed, the operation returns to the step S329. If the conditions are satisfied, namely if the substitions are completed, the operation shifts to the next step S333.

In the step S333, it is judged if all of values of R(I) up to R(N) being stored are equal. If they are equal, the step s334 is executed, and if not, it is shifted to step S335. In this case, the state where all of R(I) up to R(N) being stored are equal signifies that the value of RchCOMP has not been changed during the latest period where the N number of clock pulses are generated. More specifically, it is not a state where RchCOMP is temporarily changed, but a state where uniform tendency continuously appears during a period in which at least N number of clock pulses have been generated. Accordingly, noises contained in RchCOMP can be eliminated, except such strong noises that would continue for a period longer than that during which N number of clock pulses are generated. But such strong noises rarely appear, and even if they do appear they can be eliminated by the operations of other parts.

Therefore, in the step S334, judgment is made as is whether the value of RchCOMP is H or L, and the up-down counting is executed depending on the judged result. But since all of R (I) are the same, the judgment in the step S334 can be executed by any of N number of R(I). If the value is judged as being H, step S303 concerning the decrement of RchUDC is executed, while if it is judged as being L, step S304 concerning the increment of RchUDC is executed. In both cases, thereafter, it is shifted to step S335. In the step S335, it is judged if all the N number of B(I) being stored are the same. As a result of this judgment, if they are judged as being the same, the step S336 is executed, and if not, the sequence returns to the step S308. In this case, the state where all N number of B(I) being stored are equal signifies that the value of BchCOMP has not been changed during the latest period where N number of the clock pulses are generated. More specifically, it is not a state where BchCOMP is temporarily changed, but a state where a uniform tendency continuously appears during a period in which at least N number of clock pulses are generated. Accordingly, noises contained in RchCOMP can be eliminated, except such strong noises that would continue for a period longer than that during which N number of clock pulses are generated. But such strong noises rarely appear, and even if they do appear they can be eliminated by the operations of other parts.

In the step S336, it is judged if the value of BchCOMP is the H or L, and the up-down counting is executed in accordance with the judged result. But since all of the B(I) are the same, any one of the B(I) can be used for the judgment. If the value is judged as being the H, the step S306 for the increment of BchUDC is executed, and if it is judged as L , the step S307 for the decrement of RchUDC is executed. In both cases, thereafter the operation is returned to the step S308.

When the microcomputer 312 operates in such a manner as mentioned above, the up-down counting with respect to RchUDC or BchUDC would not be executed unless RchCOMP or BchCOMP is constant for N clock periods. Accordingly, the fluctuation of RchCOMP or BchCOMP for a short time will be eliminated from the white-balance controlling operation, thereby reducing the so-called controlling vibration. Namely, more stable operation is realized.

III. THIRD EMBODIMENT

Figure 6:
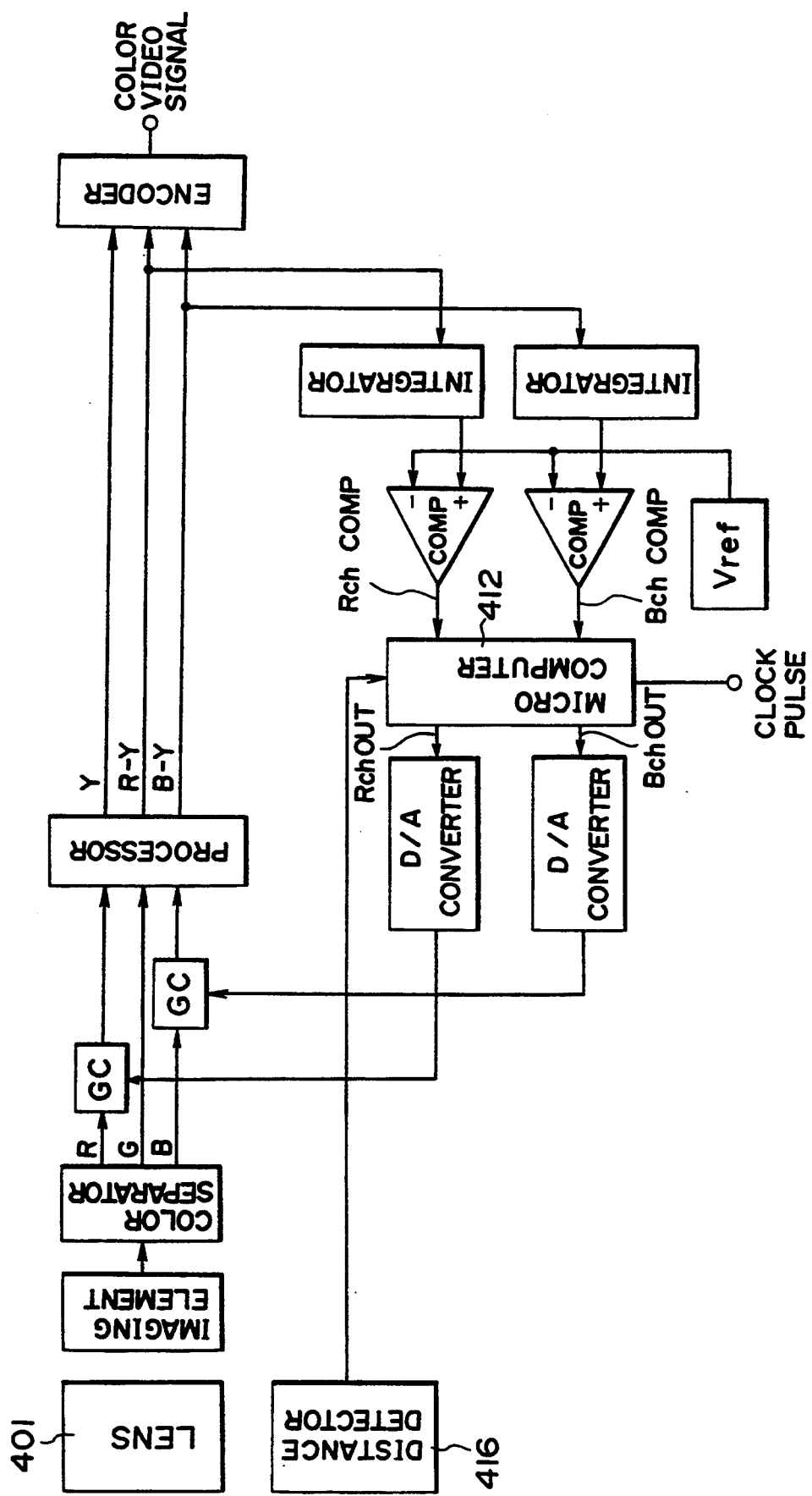
FIG. 6 is a block diagram showing the composition of a color imaging apparatus including an automatic white-balance controlling apparatus according to the third embodiment of this invention, said color imaging apparatus comprising a distance detecting apparatus.

FIG. 6 shows a color imaging apparatus comprising an automatic white-balance controlling circuit according to the third embodiment of this invention. The composition of the apparatus in FIG. 6 is substantially the same as that of the second embodiment, except for the operation and programming of the microcomputer 412 and the addition of a distance detecting device in the vicinity of the lens 401. Namely, the composition of the microcomputer 412 is such as executing the operation represented in FIG. 7, not FIG. 5. And the distance detecting device 416 measures the distance from the lens 401 to the object.

Figure 7:
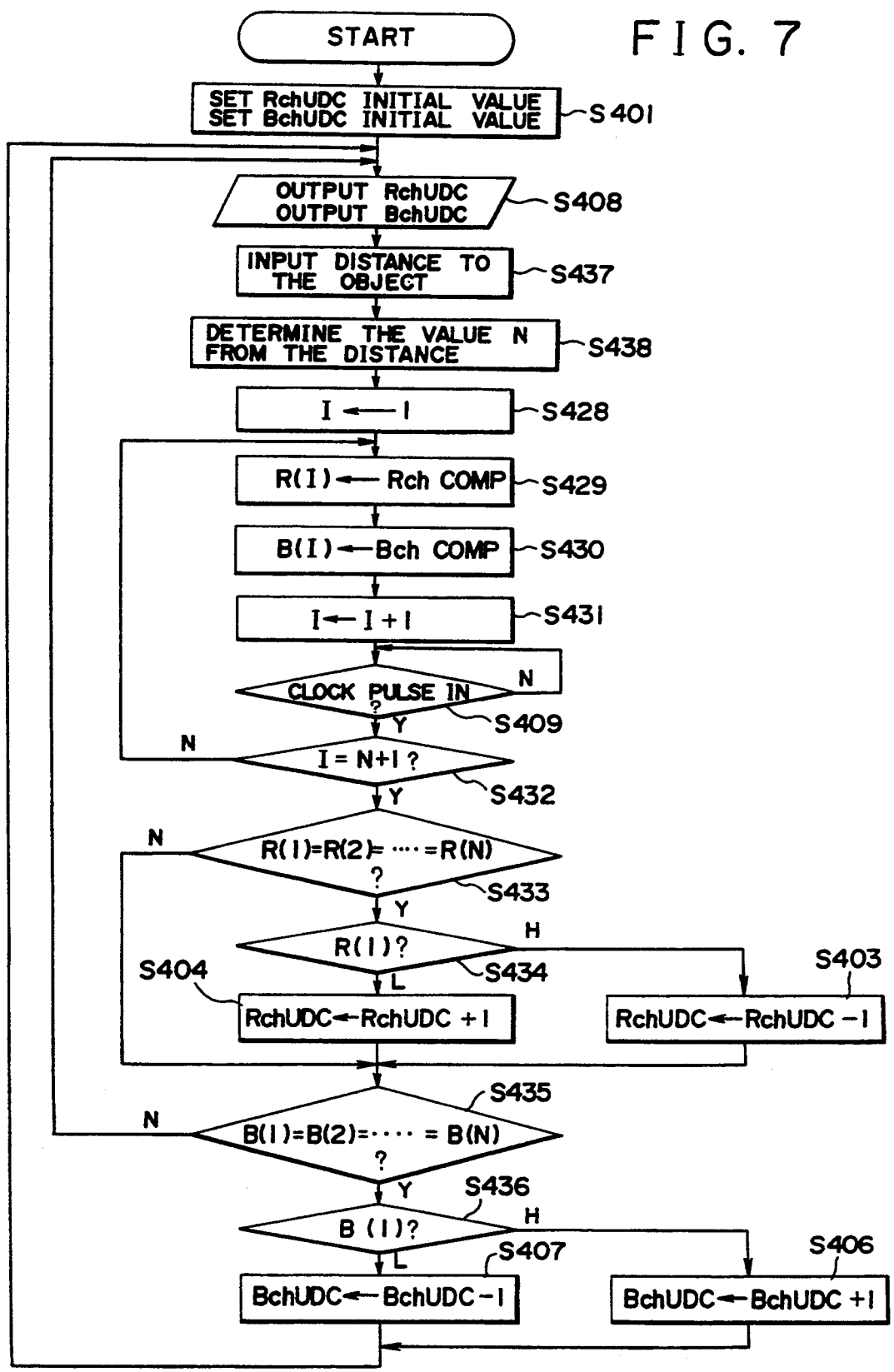
FIG. 7 is a flow diagram showing the operation of the microcomputer according to the third embodiment of this invention.

In FIG. 7, the operation starts with the initial setting of RchUDC and BchUDC (S401). Thereafter, the microcomputer 412 shifts to the normal operation to execute the following processes.

In the normal operation, firstly a step S408 is executed. In the step S408, RchUDC and BchUDC are output, in the same manner as the step S308 in the second embodiment.

Next, in advance of the execution of a step S428, being the similar operation to the step S328, steps S437 and S438 being the characteristic steps of this embodiment are executed. Namely, the microcomputer 412 receives the distance data from the lens 401 to the object sent from the distance detecting device 416 (S437), and determines the value N from the received distance (S437).

Then, the steps S429, S430, S431, S409, S432, S433, S434, S403, S404, S435, S436, S406, S407, corresponding to the steps in the second embodiment, S329, S330, S331, S309, S332, S333, S334, S303, S304, S335, S336, S306, S307, respectively, are executed.

Accordingly, in this embodiment, the same function is generated as in the second embodiment, thereby providing similar effects. In addition, since the value of N is changed in accordance with the distance from the object to the lens, any unstability of the white-balance controlling due to the distance can be prevented. For instance, if the distance is small, it is expected that RchCOMP, BchCOMP frequently change in accordance with the state change of the object. But in this case, if the operation of the apparatus in FIG. 7 is designed to set the N to a relatively large value, the undesirable influences of the frequent change can be eliminated and a stable white-balance controlling is realized.

Also, any method to determined the N, e.g. by using a change table or by executing a linear transformation can be adopted. Further, for detecting the distance from the lens to the object, such methods as detecting the focus position of the lens 401, or using a separate distance detecting apparatus, can be adopted.

VI. FOURTH EMBODIMENT

Figure 8:
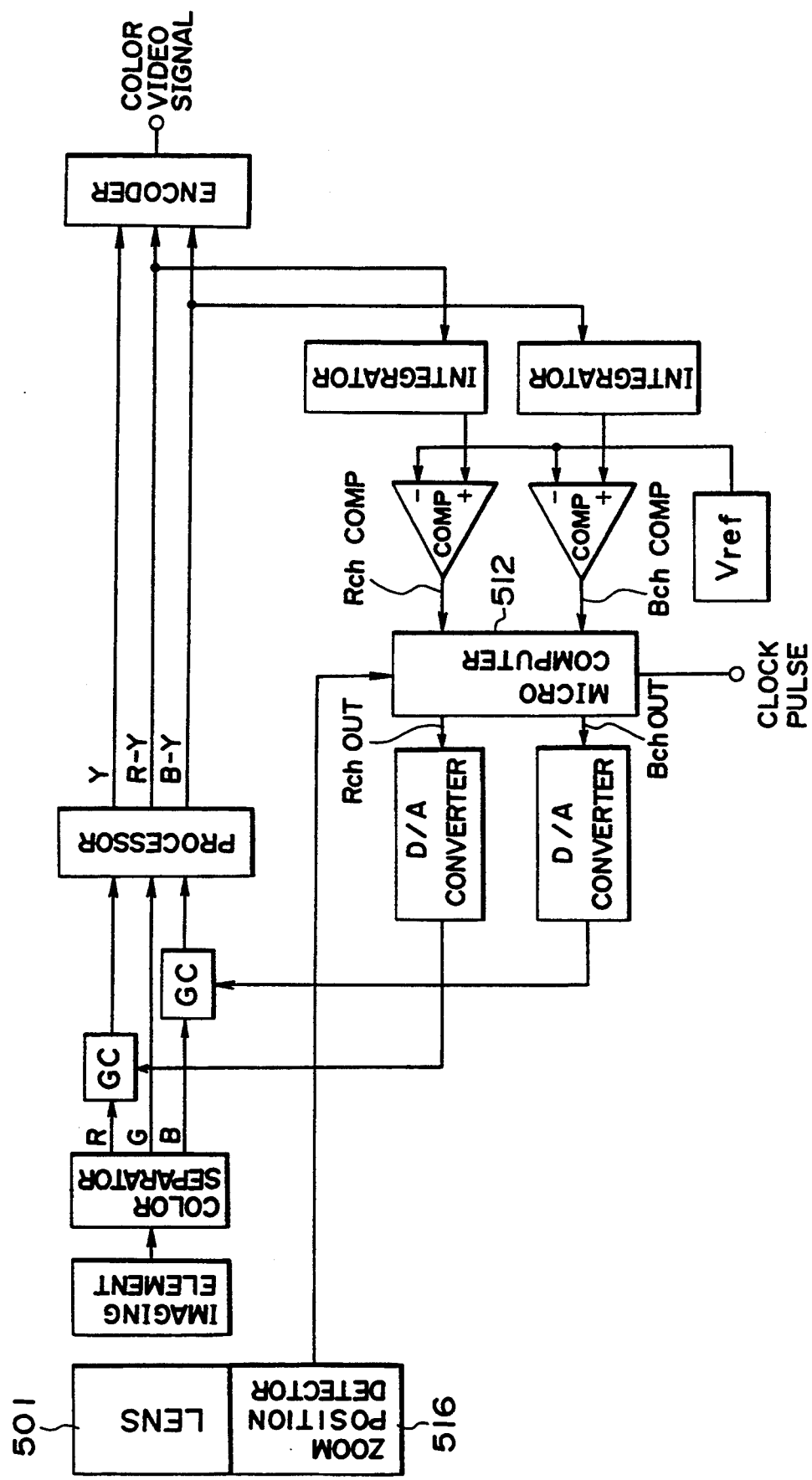
FIG. 8 is a block diagram showing the composition of a color imaging apparatus including an automatic white-balance controlling apparatus according to the fourth embodiment of this invention, said color imaging apparatus comprising a zooming position detecting circuit.

FIG. 8 shows an example of a color imaging apparatus comprising an automatic white-balance controlling circuit according to the fourth embodiment of this invention. The composition of the apparatus in FIG. 8 is substantially the same as that of the third embodiment, except for the operation and programming of the microcomputer 512 and a zoom position detecting device 516 provided the in vicinity of the lens 501. Namely, the microcomputer 512 is designed to execute the operation represented in FIG. 9, not FIG. 7, and the zoom position detecting apparatus 516 measures the zooming position of the lens 501.

Figure 9:
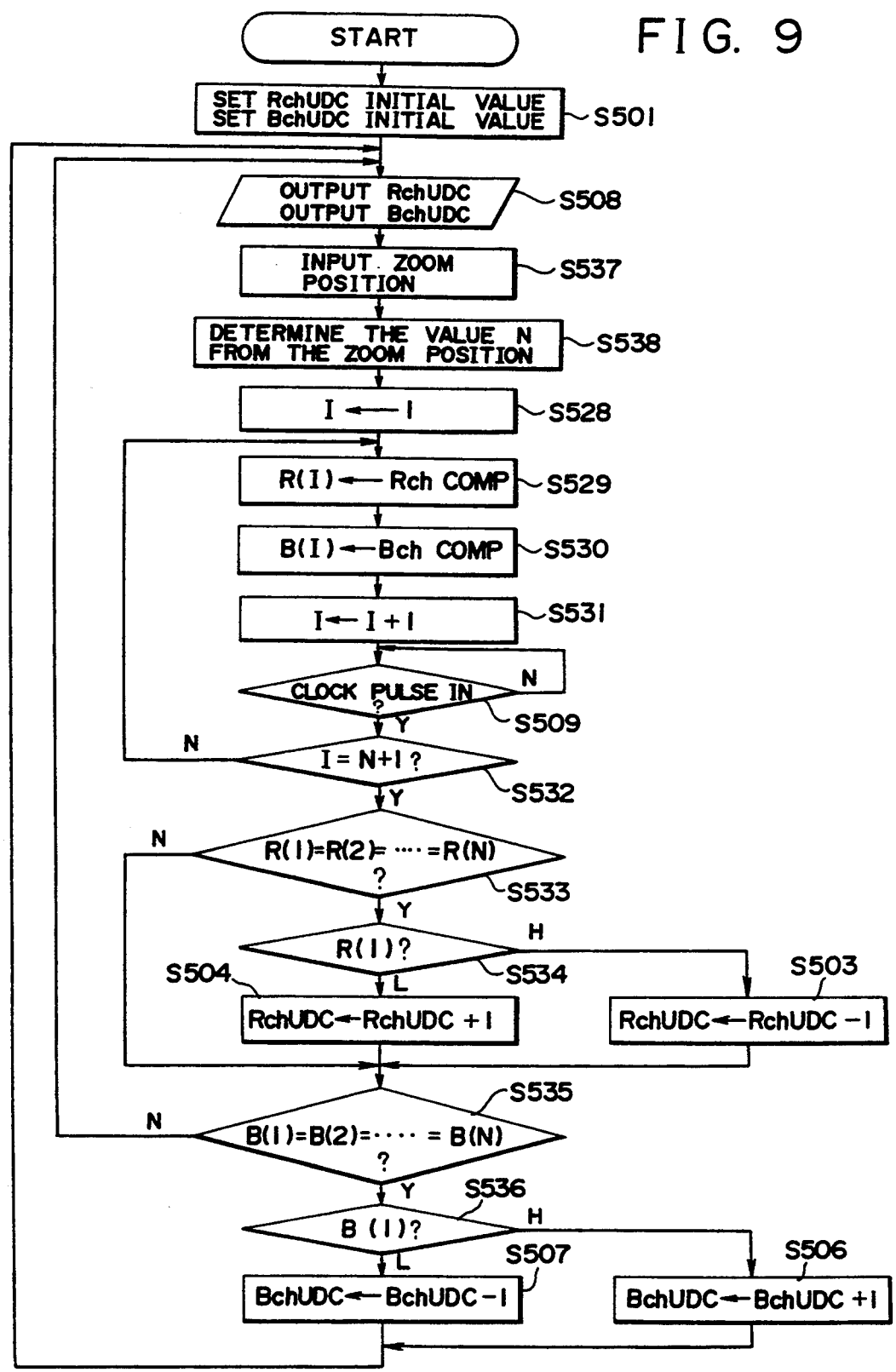
FIG. 9 is a flow diagram showing the operation of the microcomputer according to tile fourth embodiment of this invention.

The differences of the operation shown in FIG. 9 from those in FIG. 7 lie in the steps S537 and S538, and other corresponding operations are the same. In the step S537, the microcomputer 512 receives the zooming position data of the lens 501, and in the step S538 the microcomputer 512 determines the value N from the received zooming position.

Accordingly, in this embodiment, substantially the same operation as in the second embodiment is executed to provide substantially the same effects. In addition, since the value of N is changed in accordance with the zooming position, no instability of the white-balance controlling could occur irrespective of whether the zooming position is tele-side or wide-side. For instance, by setting the N to be larger in the case of tele-side and to be smaller in the case of wide-side respectively, the undesirable influence of the change of RchCOMP and BchCOMP generated with a frequency in accordance with the zooming position on the stability of the white-balance controlling can be prevented. Thus, a stable white-balance controlling operation can be attained, eliminating the effects of the frequent changes.

V. FIFTH EMBODIMENT

Figure 10:
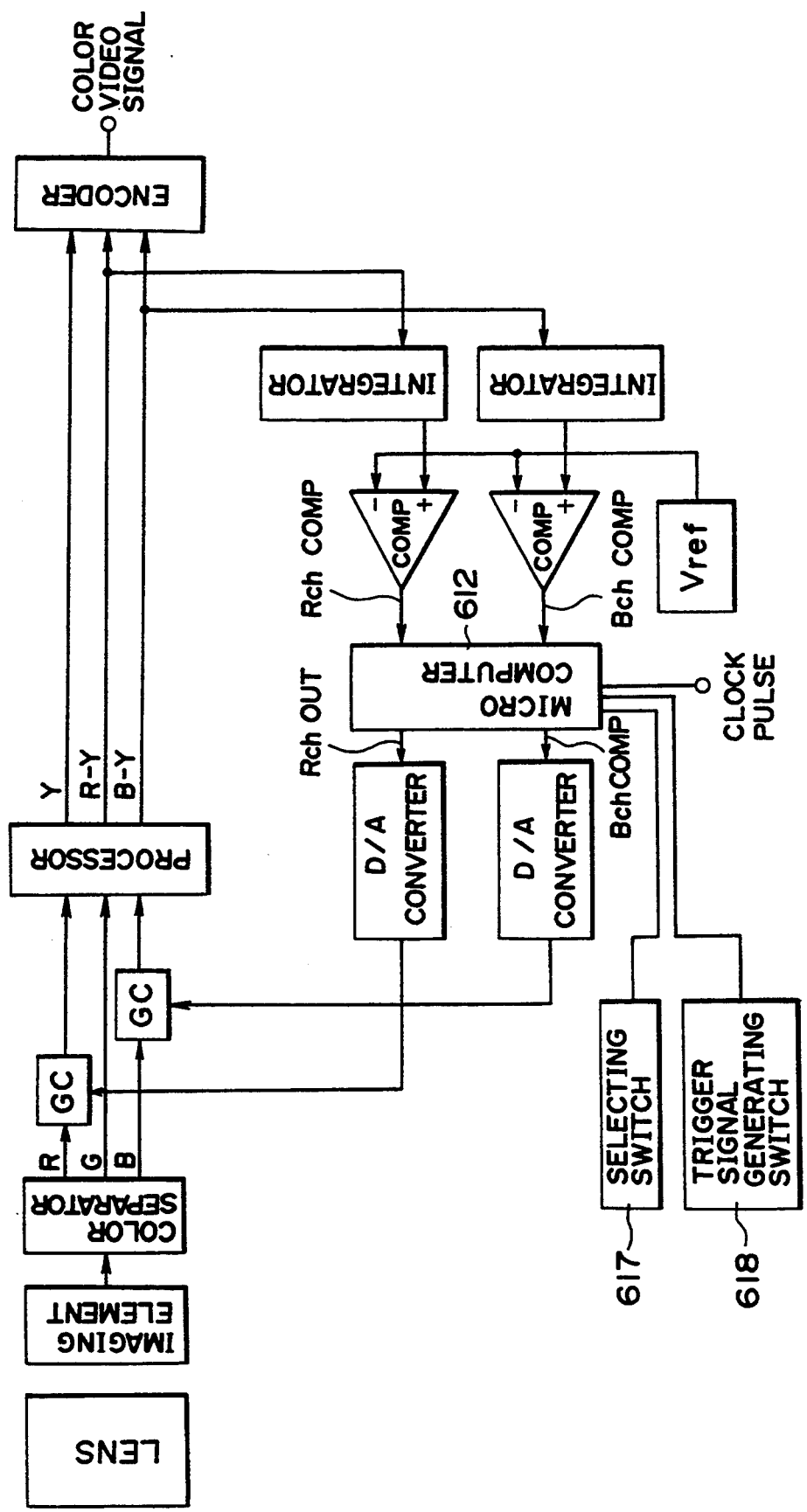
FIG. 10 is a block diagram showing the composition of a color imaging apparatus including an automatic white-balance controlling apparatus according to the fifth embodiment of this invention.
Figure 11:
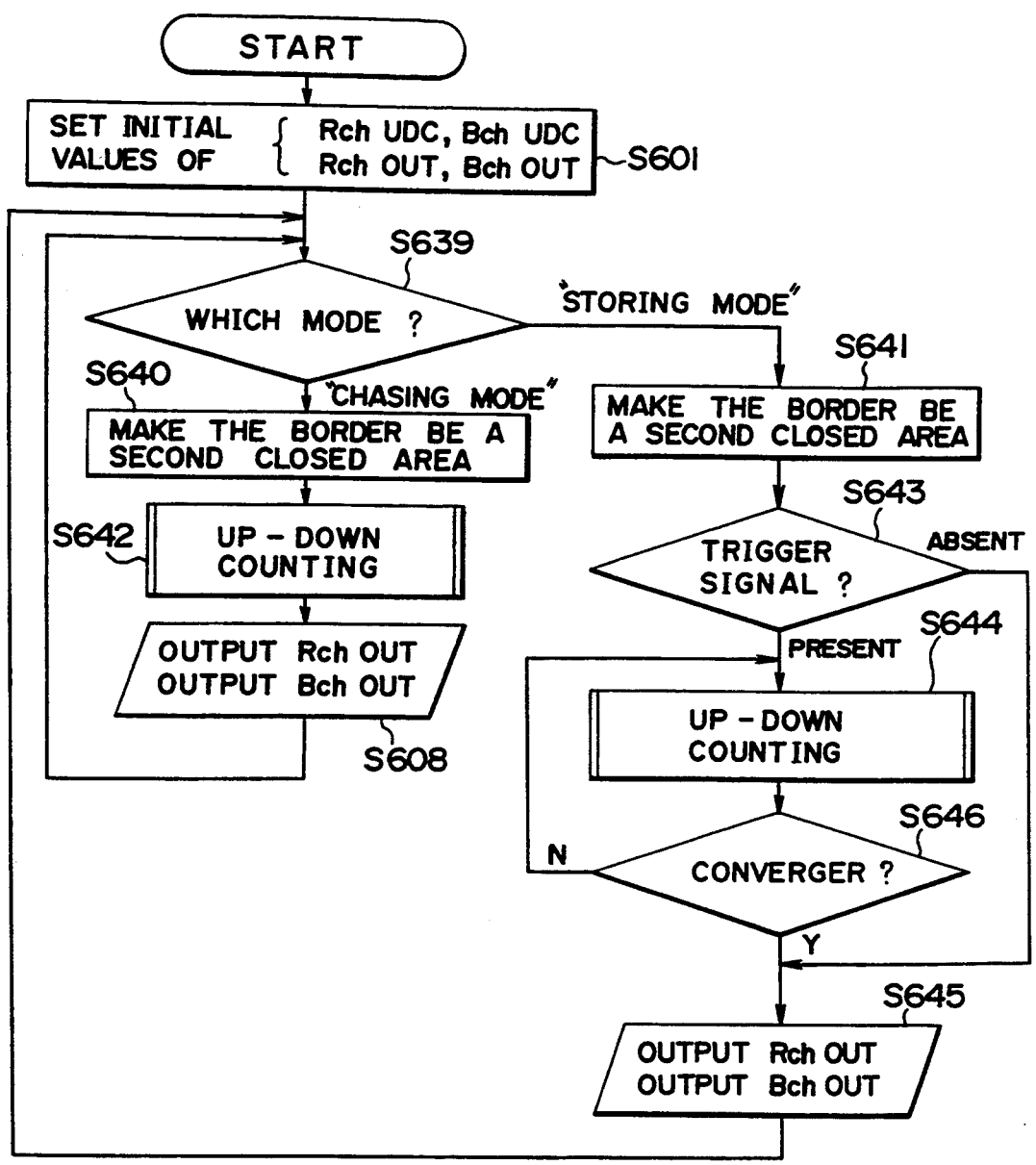
FIG. 11 is a flow diagram showing an operation of the microcomputer according to the fifth embodiment of this invention.
Figure 12:
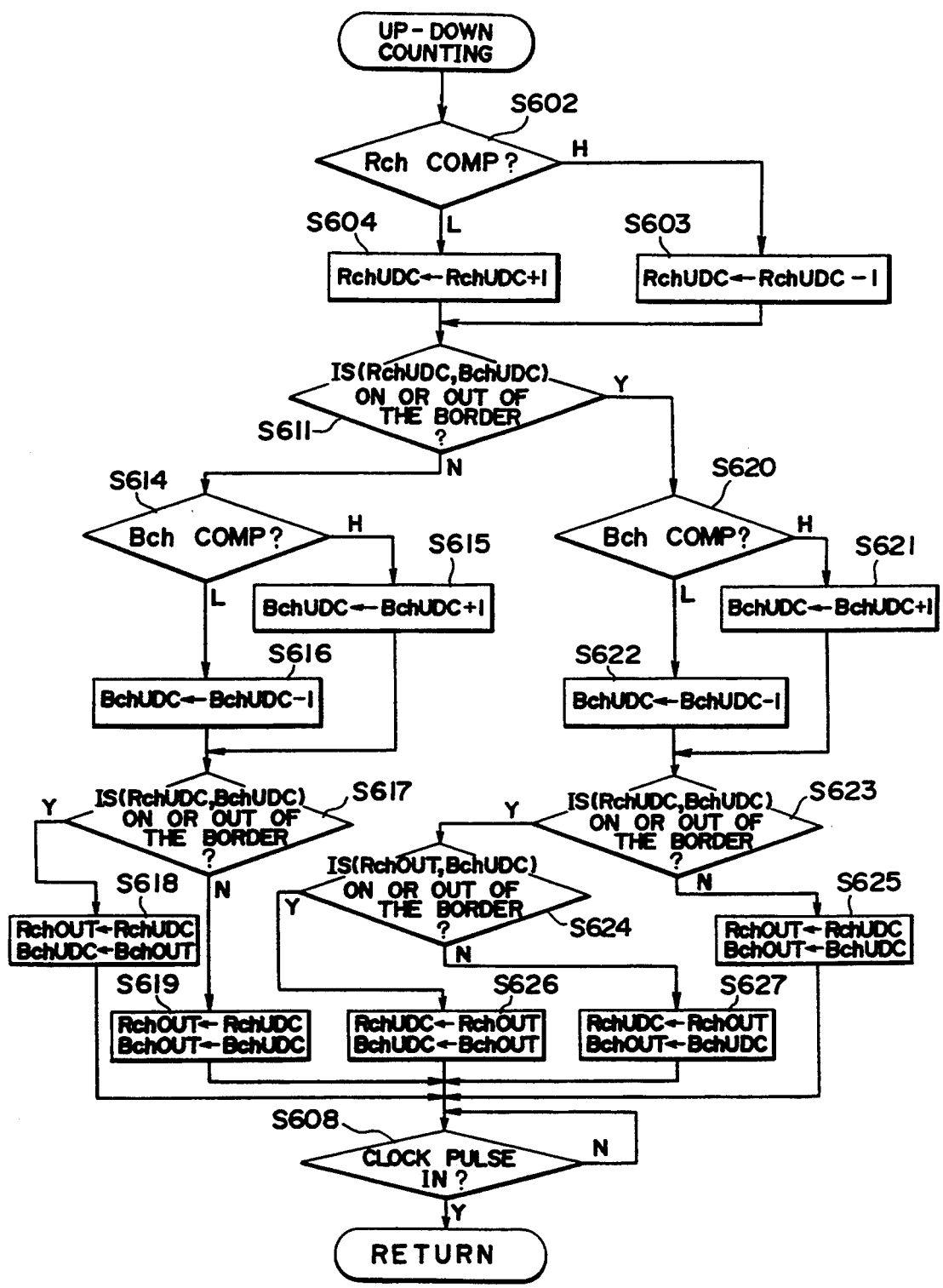
FIG. 12 is a flow diagram showing an up-down counting routine among the operations of the microcomputer according to the fifth embodiment of this invention.

FIG. 10 shows a color imaging apparatus comprising an automatic white-balance controlling circuit according to the fifth embodiment of this invention. The composition of this apparatus is almost the same as that in the first embodiment, but the differences lie in the operation and programming of the 612, and in that a selecting switch 617 and a trigger signal generating switch 618 are coupled to the microcomputer 612. Namely, the microcomputer 612 operates as represented in FIGS. 11 and 12, not FIG. 2.

In this embodiment, the microcomputer 612, after the initial setting of RchUDC, BchUDC, RchOUT, and BchOUT (S601), receives the state data of the selecting switch 617 (S639). The operation of the microcomputer 612 shifts to the step S640 in the case of following mode being selected, while it shifts to the step S641 in the case of storing mode. The first closed area and the second closed area are set as a limiting area in the steps S640 and S641 respectively.

Figure 13:
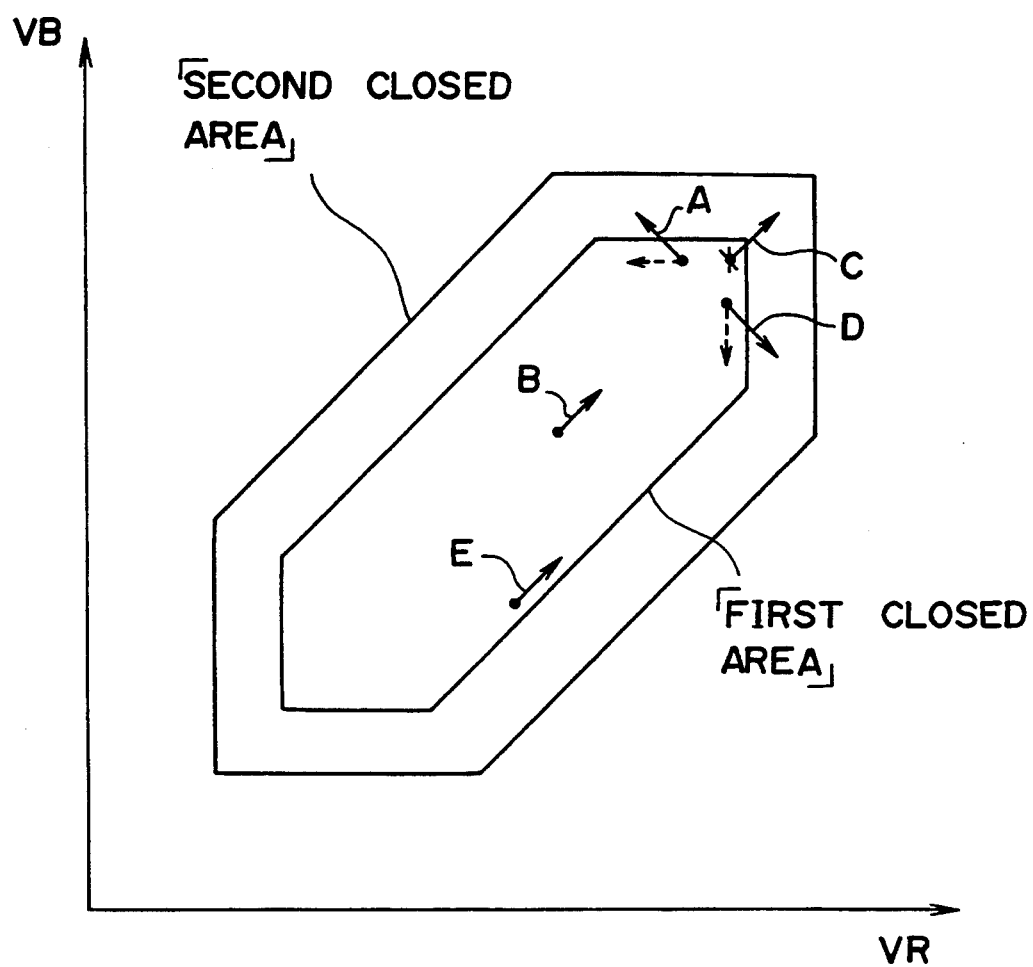
FIG. 13 is a graphic diagram showing VB-VR space in the fifth embodiment of this invention where two limiting areas are represented.

The first and the second closed areas signify closed areas on the VB-VR plane as shown in FIG. 13, being hexagonal as in the limiting area in FIG. 3. The first closed area belongs to the second closed area. Accordingly, if the operation as shown in FIG. 2 is executed with the first closed area as the limiting area, the GC control for the white-balance control would be allowed for a broader scope than when the same is executed with the second closed area as the limiting area.

In the case of the first closed area being set as the limiting area, step S642 is executed. In this step S642, the up-down counting routine as shown in FIG. 12 is executed. Its detailed operation will be described later, though the basic contents of the step S642 are substantially the same as those in FIG. 2.

After the step S642, tile microcomputer 612 outputs RchOUT and Bch0UT (S608), thereby controlling the GC gain. Thereafter, it is returned to the step S639.

In case of the second area being set as the limiting area, a step S643 is executed. In this step S643, the state data of the trigger signal generating switch 618 is read and judged. Namely, the trigger signal generating switch 618 generates a trigger signal under predetermined conditions, and the microcomputer 612 executes a step S644 in the case of a trigger signal generation and executes a step S645 in the case of no trigger signal generation.

In step S644, substantially the same up-down counting routine as in the step S642 is executed. After step S644, a judgment as to whether the convergence is made or not is executed (S646), and the sequence progresses to the step S645 if the judged result is affirmative while it returns to the step S644 if the result is negative. The step S645 has the same contents as the step S608, and thereafter the microcomputer returns to the step S639.

Next, the up-down counting routine shown in FIG. 12 will now be described. This routine is executed in the steps S642 and S644.

Firstly, the microcomputer 612 executes the steps S602– S604. In the step S602, it is judged if the value of RchCOMP is H or L. If it is judged as being the H, RchUDC is decremented by one (S603), and if it is judged as being the L, RchUDC is incremented by one (S604).

Secondly, the step S611 is executed. In the step S611, it is judged if the coordinates (RchUDC, BchUDC) are on or out of the border of the limiting area. In this case, the first or second closed areas are established in the preceding steps S640 or S641. In the step S611, it is judged if the coordinates deviate from the limiting area at the stage where only the up-down counting based on RchCOMP is executed. If the deviation is confirmed by the judgment, the step S620 is executed, while if it is not confirmed, the step S614 is executed.

In the step S614, it is judged if the value of BchCOMP is H or L. If it is judged as being the H, the step S615 where BchUDC is incremented by one is executed, while if it is judged as being the L, the step S616 is executed where BchUDC is decremented by one.

The next step S617 is operatively the same as the step S611. But since the up-down counting based on BchCOMP is already executed in the preceding steps, the significance of the judgment is different. Namely, in the step S617, the coordinates (RchUDC, BchUDC) to be judged to see if they pertain to the limiting area are the coordinates after the execution of the up-down counting based on both RchCOMP and BchCOMP.

In the step S617, if it is judged as "on or outside of the border", the step S618 is executed. In this step S618, the contents of RchUDC are substituted for RchOUT, while the contents of BchOUT are substituted for BchUDC. Thereafter, RchOUT and BchOUT are output in the step S608, and then the microcomputer returns to the main routine. If it is judged as "not on or out of the border of the limiting area", the step S619 is executed. In this step S619, the contents of RchUDC are substituted for RchOUT, while the contents of BchUDC are substituted for BchOUT. Thereafter, it returns to the step S608, thereby operating in the same manner as after the execution of the step S618.

On the contrary, in the step S608, if it is judged as being "on or outside of the border", the steps S620 and S621 or S622 are executed. Namely, the up-down counting is executed in accordance with the value of BchCOMP, and the counted result is stored in BchUDC.

Next, the step S623 is executed. In the step S623, as in the step S617, it is judged if the coordinates (RchUDC, BchUDC) after the up-down counting operation based on both RchCOMP and BchCOMP pertain to the limiting area.

After the execution of the step S623, steps S624 and S625 are executed. The step S624 is executed when the judged result in the step S623 is "on or outside of the border", while the step S625 is executed when the judged result is "not on or out of the border". In the step S624, it is judged if the coordinates (RchOUT, BchUDC) are on or out of the border of the limiting area. A step S626 is executed in the case of the judged result being affirmative, while a step S627 is executed in the case of the judged result being negative. In the step S626, RchOUT is substituted for RchUDC, while BchOUT is substituted for BchUDC. In the step S627, RchOUT is substituted for RchUDC, while BchUDC is substituted for BchOUT. After these operations, a step S608 is executed.

In the step S625, RchUDC is substituted for RchOUT, while BchUDC is substituted for BchOUT. After these operations, a step S608 is executed.

The microcomputer 612 operates as mentioned above. This embodiment also provides the same effects as in the first embodiment. Namely, in this embodiment, the microcomputer 612 judges if the coordinates (RchUDC, BchUDC) and the like pertain to the limiting area, and the output values RchOUT and BchOUT are set depending on the judged result, thereby preventing the deviation of the white-balance. For example, when the changes shown by arrows A-E in FIG. 13 are considered, if the limiting area is the first closed area, the following steps will be executed depending on the changes as in the first embodiment: the step S618 in case of the change A; the step S619 in case of the change B; the step S626 in case of the change C; the step S627 in case of the change D; and the step S625 in case of the change E.

But in this embodiment, the limiting area can alternatively be set to the second area, being broader than the first area. In this case, any of the changes A-E can be allowed, namely the step S625 is executed in any case.

Thus, according to this embodiment, two types of operation, the following mode operation and the storing mode operation can be selectively executed by appropriately switching. The following mode would be suitable for a dynamic imaging since an automatic white-balance controlling operation by a relatively broad limiting area (second closed area) in accordance with the changes of the object, lightness and position of the light source for illuminating the object is executed. In the storing mode, more stable image with less white-balance deviation can be achieved since the relatively narrow limiting area (first closed area) is used.

VI. SIXTH EMBODIMENT

Figure 14:
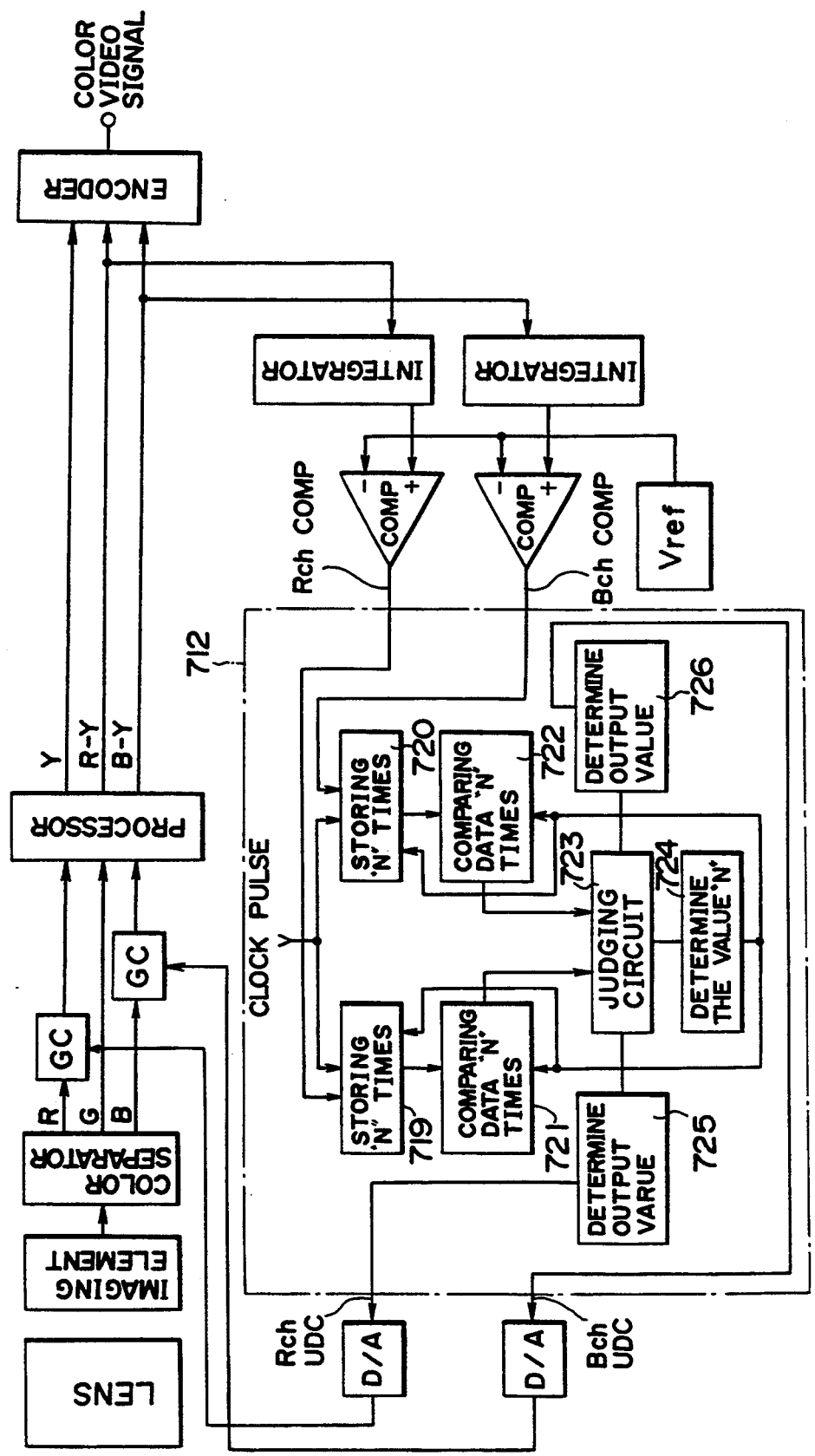
FIG. 14 is a block diagram showing the composition of a color imaging apparatus including an automatic white-balance controlling apparatus according to the sixth embodiment of this invention.

FIG. 14 shows an embodiment of the color imaging apparatus comprising an automatic white-balance controlling apparatus according to the sixth embodiment of this invention. Although the basic composition of the shown apparatus is substantially the same as that in FIG. 4, the differences lie in the microcomputer 712 being composed of hard logic and operating differently from the microcomputer 212 in FIG. 4.

The microcomputer 712 comprises: a N-times memory 719 for memorizing RchCOMP in number of N in accordance with the clock pulses; a N-times memory 720 for memorizing BchCOMP in number of N in accordance with the clock pulses; a N-times data memory 721 for judging the concordance of the contents in the N-times memory 720; a judging section 723 for judging the direction of the counting (increment or decrement); a N-value determining section 724 for determining the N value; an output value determining section 725 for outputting RchUDC being the result of the up-down counting with regard to RchCOMP; an output value determining section 726 for outputting BchUDC being the result of the up-down counting with regard to BchCOMP.

Figure 15:
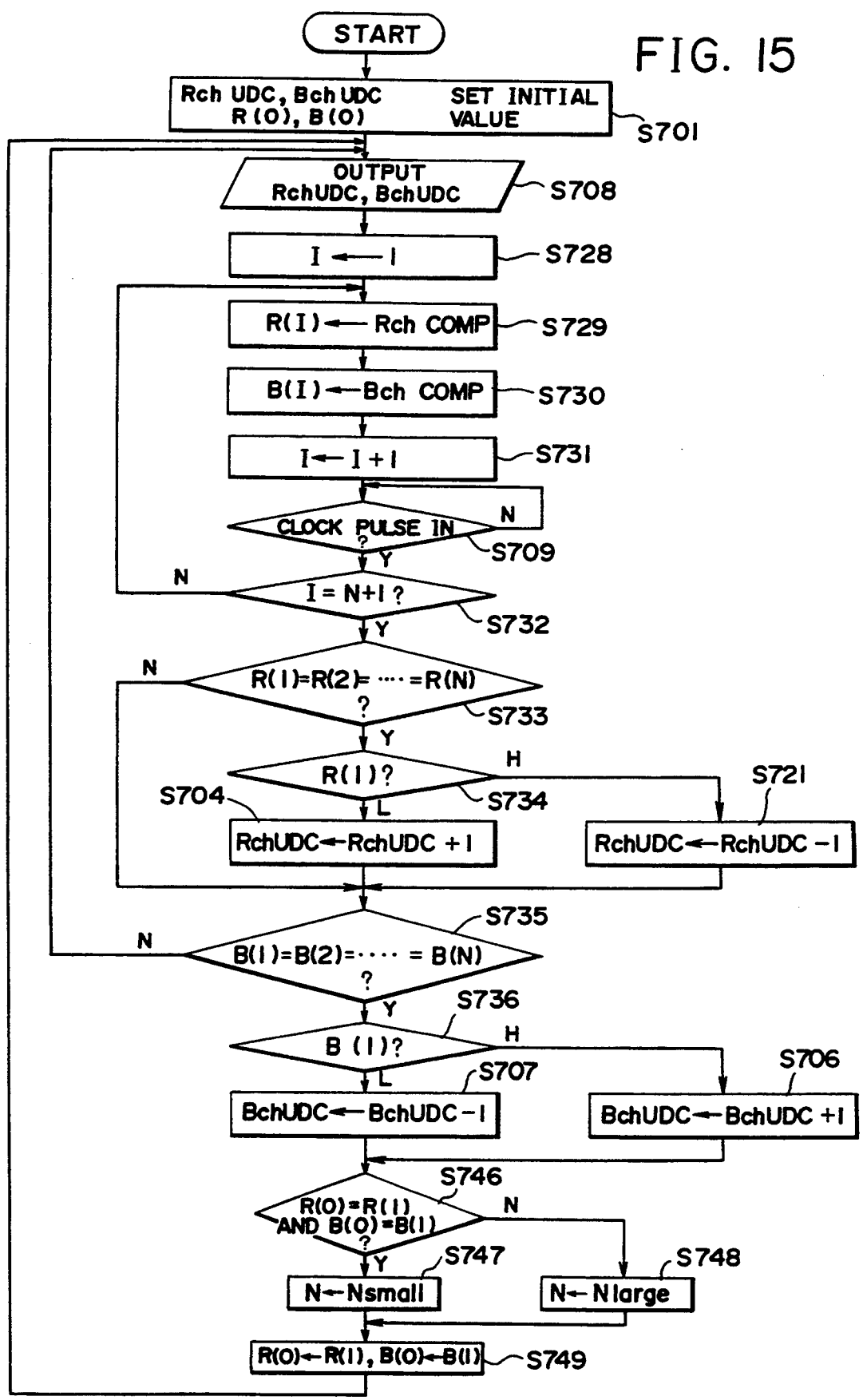
FIG. 15 is a flow diagram showing the operation of the microcomputer according to the fifth embodiment of this invention.

Next, the operation of the microcomputer 712 will now be described. FIG. 15 shows the flow of this operation.

Steps constituting the operations in FIG. 15 correspond to those in FIG. 5. For example, as the step S701 corresponds to the step S301 in FIG. 5, the steps in both cases having the same of lower two digits operate in the same manner. But the difference of this embodiment from the second embodiment lie in steps S746–S749 which will be described hereinafter.

Firstly, the up-down counting with respect to RchUDC and BchUDC are executed in the step S746. In the step S746, it is judged if R(0) and RchUDC, and B(0) and BchUDC are the same respectively. Since the cases where RchCOMP and BchCOMP are unstable are eliminated in the steps S733 and S735, RchUDC and BchUDC become equal to the R(1) and B(1) respectively. In consequence, in the step S746, the R(1) is substituted for RchUDC, and the B(1) is substituted for BchUDC.

In the step S746, if it is judged that both of the equations are effective, Nsmall is substituted for N (S747), while if it is judged as not effective, Nlarge is substituted for N (S748). After the steps S747 or S748, R(1) is substituted for R(0) while B(0) is substituted for B(0) (S749), and thereafter the operation is shifted to the step S708.

A predetermined initial value is already set for R(0) and B(0) in the step S701.

The significance of the above-mentioned operation can be described as follows:

As clearly understood from the operation in the step S749, the R(0) and B(0) stand for RchCOMP and BchCOMP after the execution of the up-down counting with regard to RchCOMP and BchCOMP at the last time. Accordingly, the operation in the step S746 is for judging if the RchCOMP or the BchCOMP have changed from the viewpoint of preceding up-down counting with regard to BchCOMP. Namely, the N is set to a smaller value when RchCOMP or BchCOMP is expected to change in a relatively short term, while the N is set to a larger value when that is not expected to change for a long term.

By setting the value of N as mentioned-above, the deviations of RchCOMP or BchCOMP arising in a short term due to e.g. noises can be eliminated to provide a more stable white-balance controlling. Of course, the same effects as obtained by the second embodiment can be rendered in this embodiment.

Figure 16A:
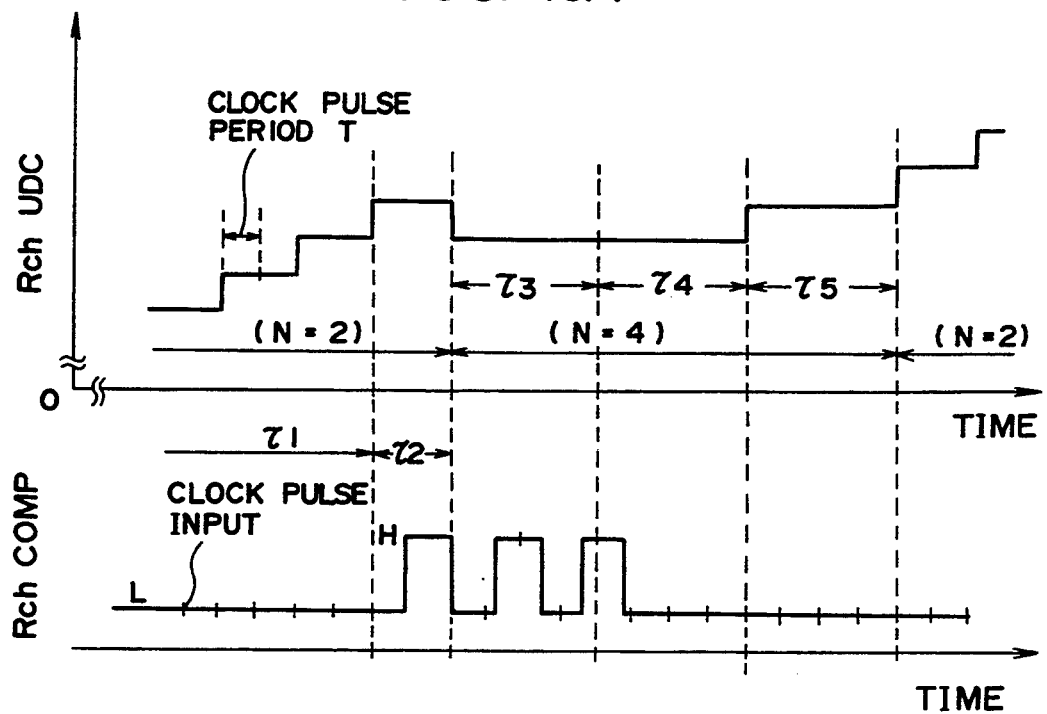
FIG. 16A is a timing diagram showing the outputs of the D/A converter and the comparing circuit in the sixth embodiment of this invention.
Figure 16B:
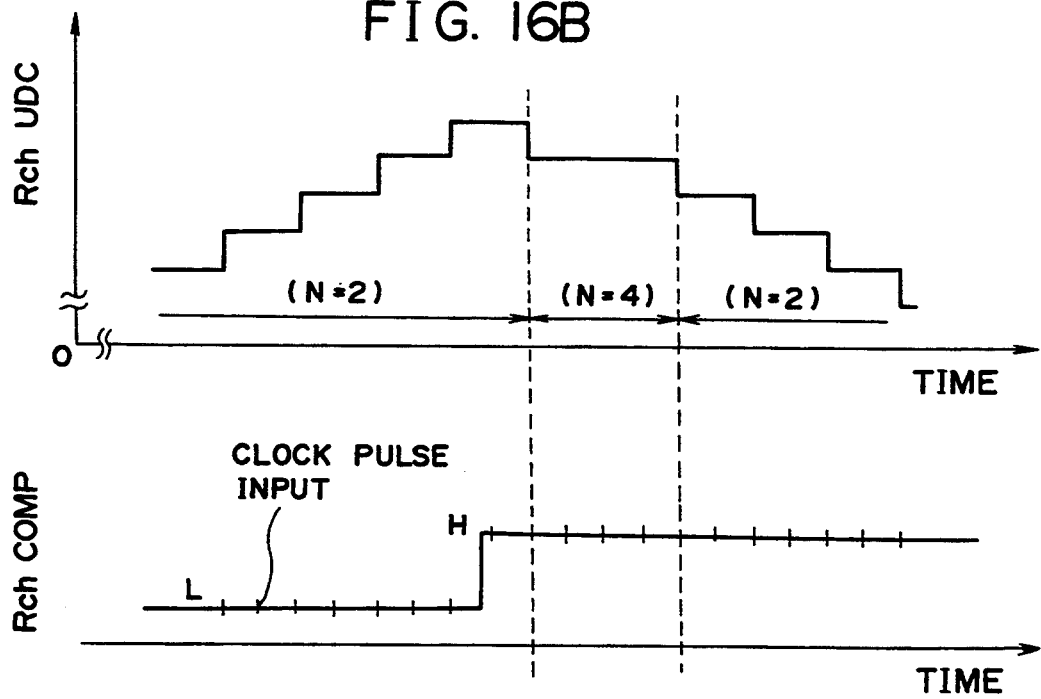
FIG. 16B is a timing diagram showing the outputs of the D/A converter and the comparing circuit in the sixth embodiment of this invention.

FIGS. 16A and 16B show examples of the operation where Nsmall=2, Nlarge=4.

In the case of FIG. 16A, the average voltage of the R-Y signal for one screen is significantly lower than the reference voltage, requiring an to increase in the R signal level. In FIG. 16A, only RchCOMP and RchUDC are shown. In such a case, the value of RchCOMP would be L for a long term. Since the condition R(0)=R(1) becomes effective during a period $\tau 1$ where the value of the RchCOMP does not change, a step S747 will be executed if the condition B(0)=B(1) is effective. As a result, it is set to N=2. During this period, RchUDC will be changed every two cycles of the clock pulses.

In the next period $\tau 2$, since the value of RchCOMP is changed, the condition R(0)=R(1) becomes ineffective and a step S748 is executed. Then, the value of N is changed to N=4. As a result, during the period $\tau 3$ until the execution of the next step S746, the clock pulses will continue for a term of four cycles of the clock pulses.

During the period $\tau 3$, once the value of RchCOMP is changed, and after the starting of the period, the value H of RchCOMP when receiving the fourth clock pulse is different from the value L at receiving the first clock pulse. Accordingly, since the conditional formula of the step S746 can not be satisfied, a step S748 is executed. Namely, the successive period $\sigma 4$ will also be a period corresponding to four clock pulses.

During the period $\tau 4$, once the value of RchCOMP is changed, and after the starting of the period, the value L of RchCOMP when receiving the fourth clock pulse is different from the value H when receiving the first clock pulse. Accordingly, since the conditional formula of the step S746 can not be satisfied, a step S748 is executed. Namely, the successive period $\tau 5$ will also be a period corresponding to four clock pulses.

During the period 5, if the values of both RchCOMP and BchCOMP have not been changed, the step S747 is executed to set the value of N to N=2.

Thus, the controlling vibrations caused by other factors than the color temperature change, for example, can be eliminated.

Next, the case of FIG. 16B will now be described. This is a case where the average value of the R-Y signal for one screen has significantly changed due to the change of the color temperature of the object. In this case, the value of N is changed from 2 to 4 reflecting the change, and thereafter changed from 4 to 2 reflecting the termination of the change.

Thus, according to this embodiment, controlling vibrations caused by noises etc. can be prevented so as to provide a more stable white-balance controlling operation. Namely, the color difference signal would scarcely vary by any factors other than the color temperature difference of the illuminating light of the object.

VII. SEVENTH EMBODIMENT

Figure 17:
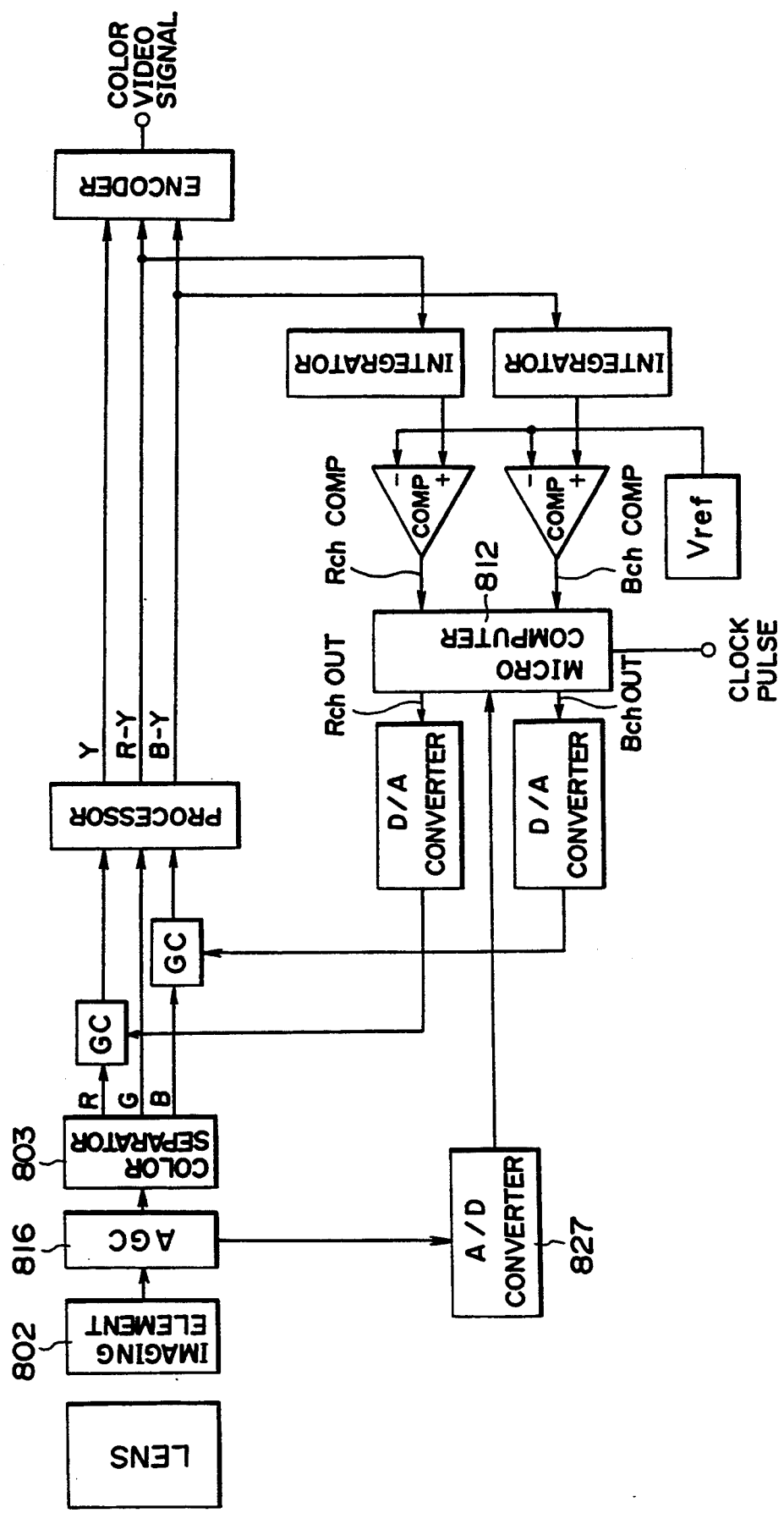
FIG. 17 is a block diagram showing a composition of a color imaging apparatus including an automatic white-balance controlling apparatus according to the seventh embodiment of this invention, said color imaging apparatus comprising an AGC (auto gain controller)

FIG. 17 shows a color imaging apparatus comprising an automatic white-balance controlling circuit according to the seventh embodiment of this invention. Although the composition is substantially the same as in the second embodiment, the differences lie in a microcomputer 812, an automatic gain controlling circuit 816 coupled between a imaging element 812 and the color separating circuit 803, and an A/D converting circuit 827 coupled between the automatic gain controlling circuit 816 and the microcomputer 812. Namely, the operation and programming of the microcomputer 812 is aimed at executing the operation represented in FIG. 18 and not in FIG. 4, and the imaging signal output from the imaging element 802 is gain-controlled by the automatic gain controlling circuit 816 and the gain data is supplied to the A/D converting circuit 827.

Figure 18:
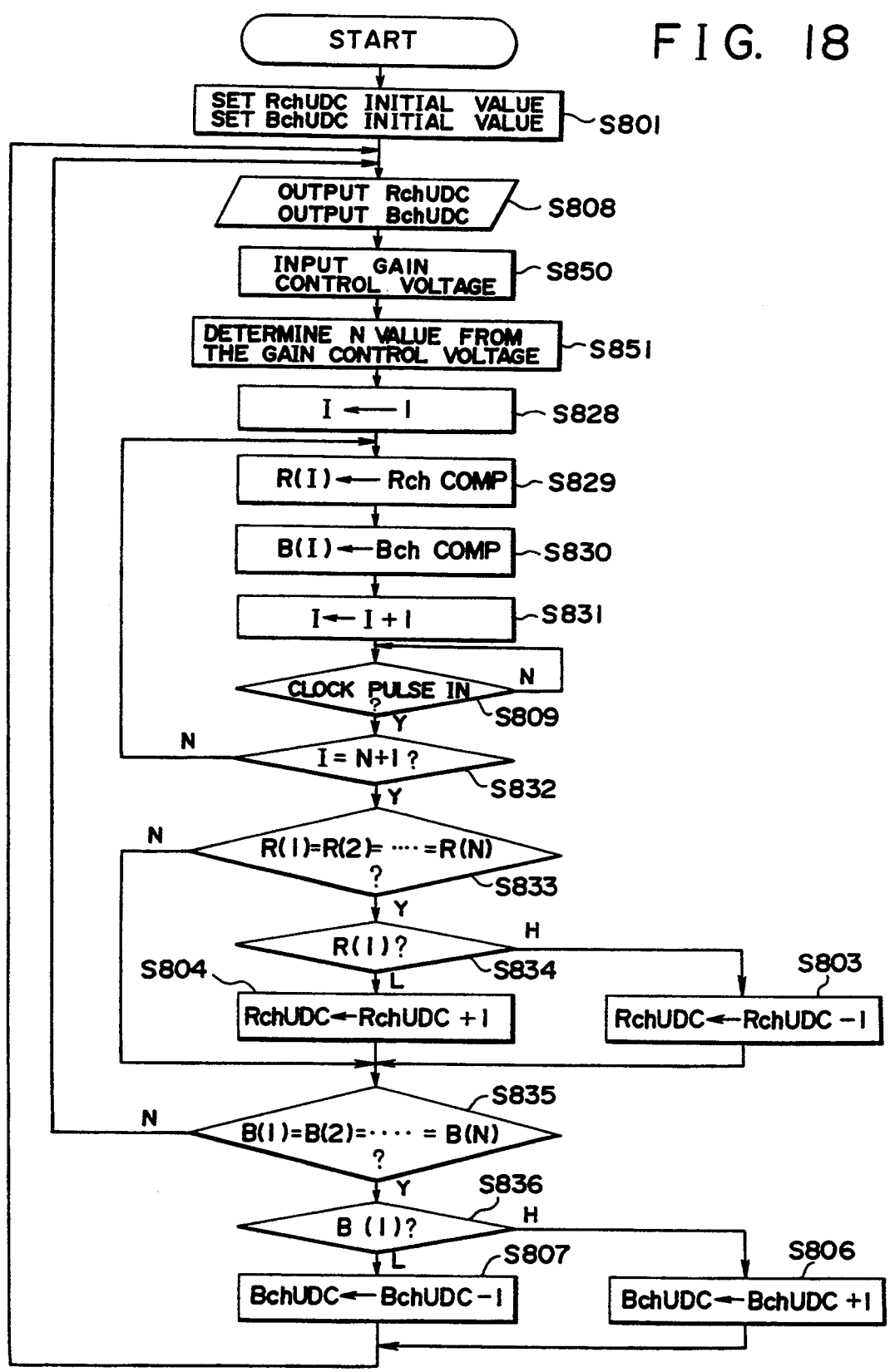
FIG. 18 is a flow diagram showing the operation of the microcomputer according to the seventh embodiment of this invention.

FIG. 18 shows an operating flow of the microcomputer 812. The steps shown in FIG. 18 correspond to those in FIG. 5. Namely, the steps having the same lower two digits perform the same function. The difference of this embodiment from the second embodiment lies in that the N is set in accordance with the gain controlling voltage which is the gain of the automatic gain controlling circuit 816. Specifically, after the execution of the step S808, the microcomputer 812 receives the gain controlling voltage (S850), and sets N in accordance with the received result (S851).

In this manner, a stable white-balance control can be achieved by preventing the controlling vibrations even when the lightness of the object is insufficient and the gain of the automatic gain controlling circuit 816 is high, namely, RchCOMP and BchCOMP tend to be unstable. Further, if the lightness of the object is sufficient, a response property for quickly following the change of the lightness of the light source for illuminating the object can be obtained.

VIII. EIGHTH EMBODIMENT

Figure 19:
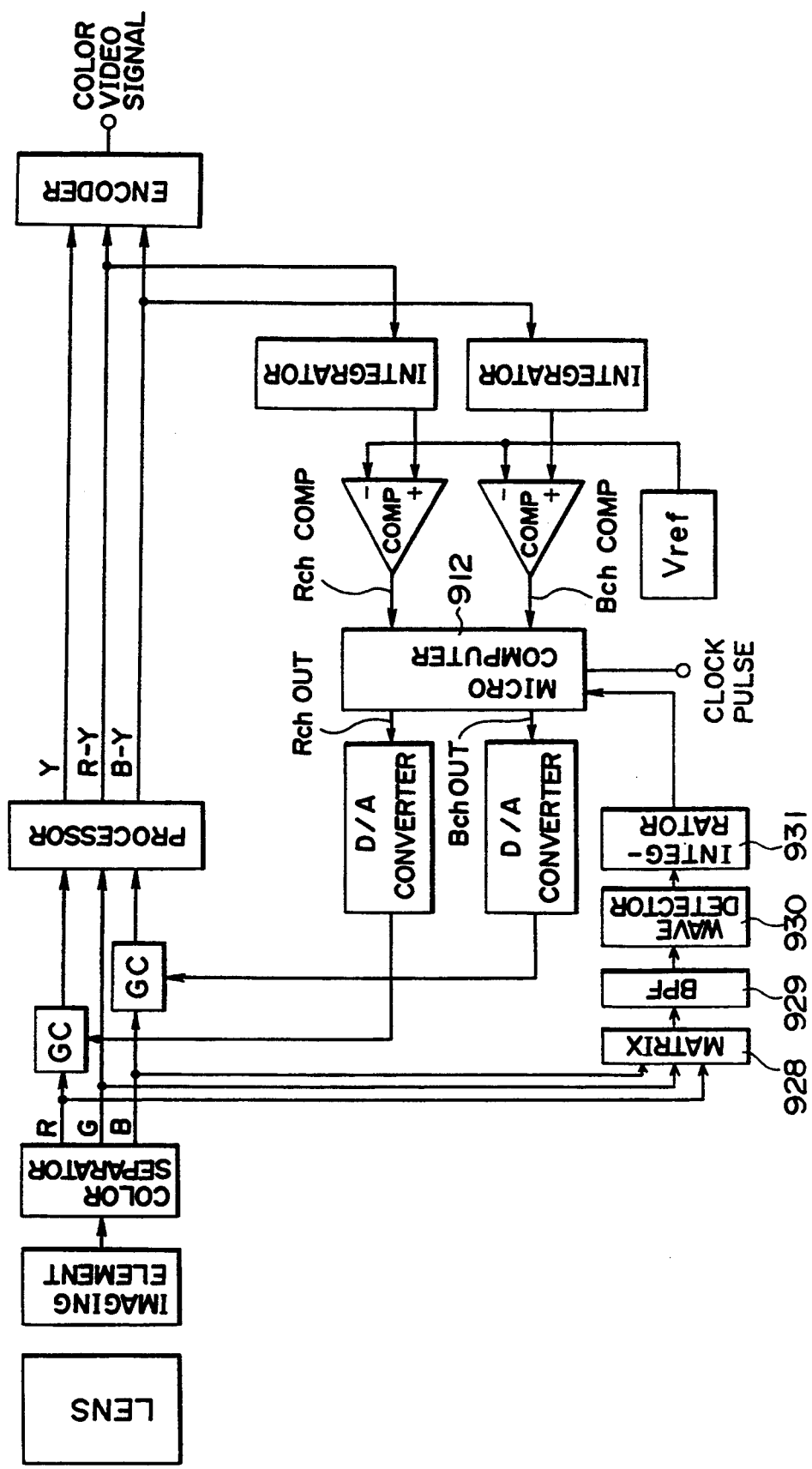
FIG. 19 is a block diagram showing the composition of a color imaging apparatus including an automatic white balance controlling apparatus according to the eighth embodiment of this invention.

FIG. 19 shows a color imaging apparatus comprising an automatic white-balance controlling circuit according to the eighth embodiment of this invention. Although the composition of the apparatus in this embodiment is almost the same as that in the first embodiment, several changes and modifications are made. For example, firstly, a microcomputer 912 is aimed at executing the operation represented in FIGS. 20 and 21, not FIG. 2. Further, in this embodiement the following components are newly provided: a matrix circuit 928 for generating brightness signals by receiving the color signals R, G, B and matrixing them; a band-pass-filter 929 for extracting the high-frequency component from tile brightness signal; a wave detecting circuit 930 for wave-detecting the high-frequency component 930; a integrating circuit 931 for integrating the output of the wave-detecting circuit 930 and supplying the integrated data to the microcomputer 912.

Figure 20:
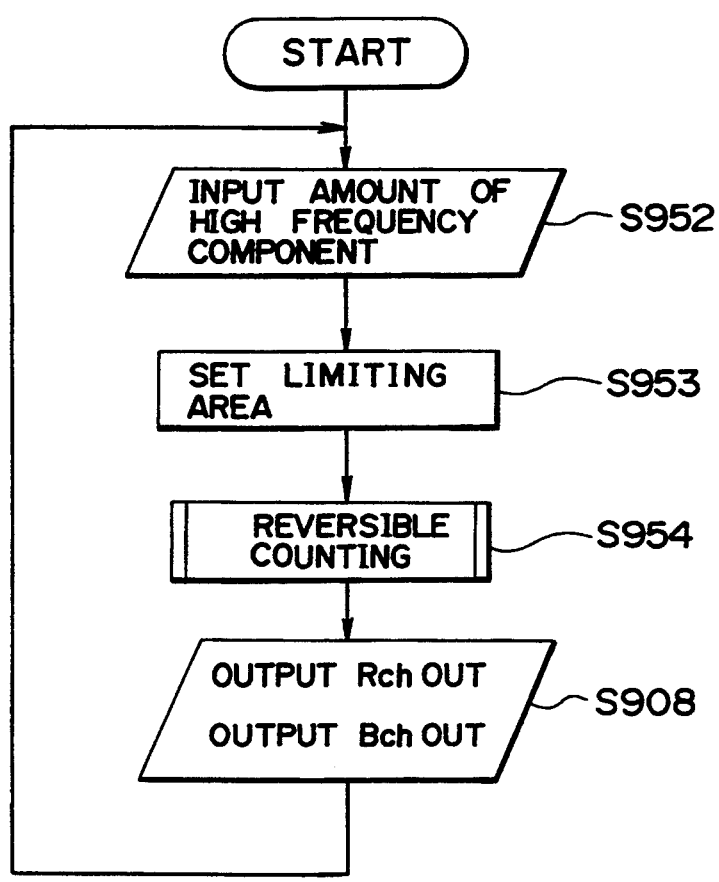
FIG. 20 is a flow diagram showing the operation of the microcomputer according to the eighth embodiment of this invention.

The operation of the microcomputer 912 shown in FIG. 20 start with receiving the output value of the integrating circuit 931 (S952). This output value stands for the amount of the high-frequency component extracted by the band-pass-filter 929. In the successive step S953, a limiting area is set in accordance with the amount of the high-frequency component, and subsequently the up-down counting (S954) and the outputting of RchOUT and BchOUT (S908) are executed.

Figure 22:
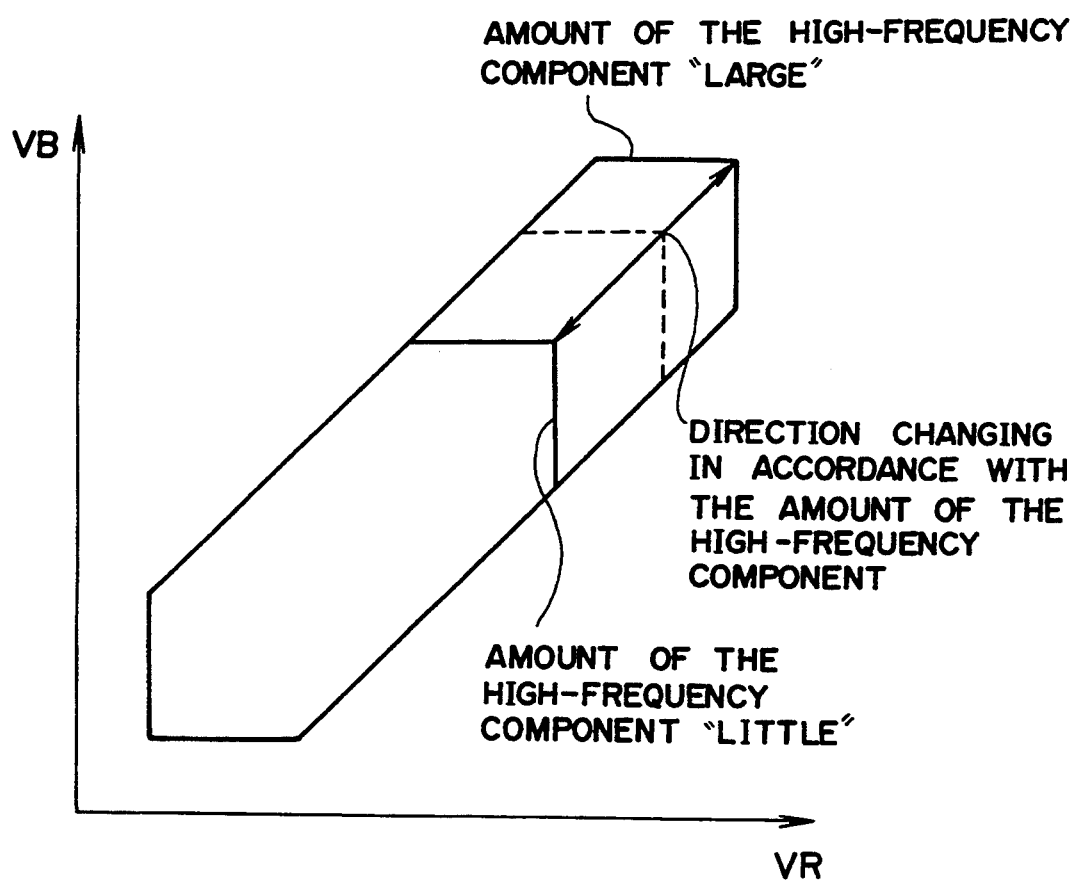
FIG. 22 is a graphic diagram showing VB-VR space in the eighth embodiment of this invention, where the wide-narrow switching operation of the limiting area is represented.

In this embodiment, the term "limiting area" signifies the same concept as described in the first embodiment referring to FIG. 3. But the differences of this embodiment from the first embodiment lie in setting the limiting area variably and in performing this variable setting in accordance with the amount of the high-frequency component. For example, as shown in FIG. 22, the limiting area is set to be broader when the amount of the high-frequency component is large, while it is set to be narrower when the same is small. Thus, the deviation of the white-balance controlling can be reduced, providing an image with more natural colors.

This is because the amount of the high-frequency is generally small when the object is nearly all one color, such as blue sky, while it is large when the color temperature is high and the whole object is blue. Accordingly, if the limiting area is set narrower to limit the width of the white-balance controlling when the amount of the high-frequency component is small, the deviation of the white-balance control toward the magenta and green directions can be reduced. This embodiment has enabled such operations.

Figure 21:
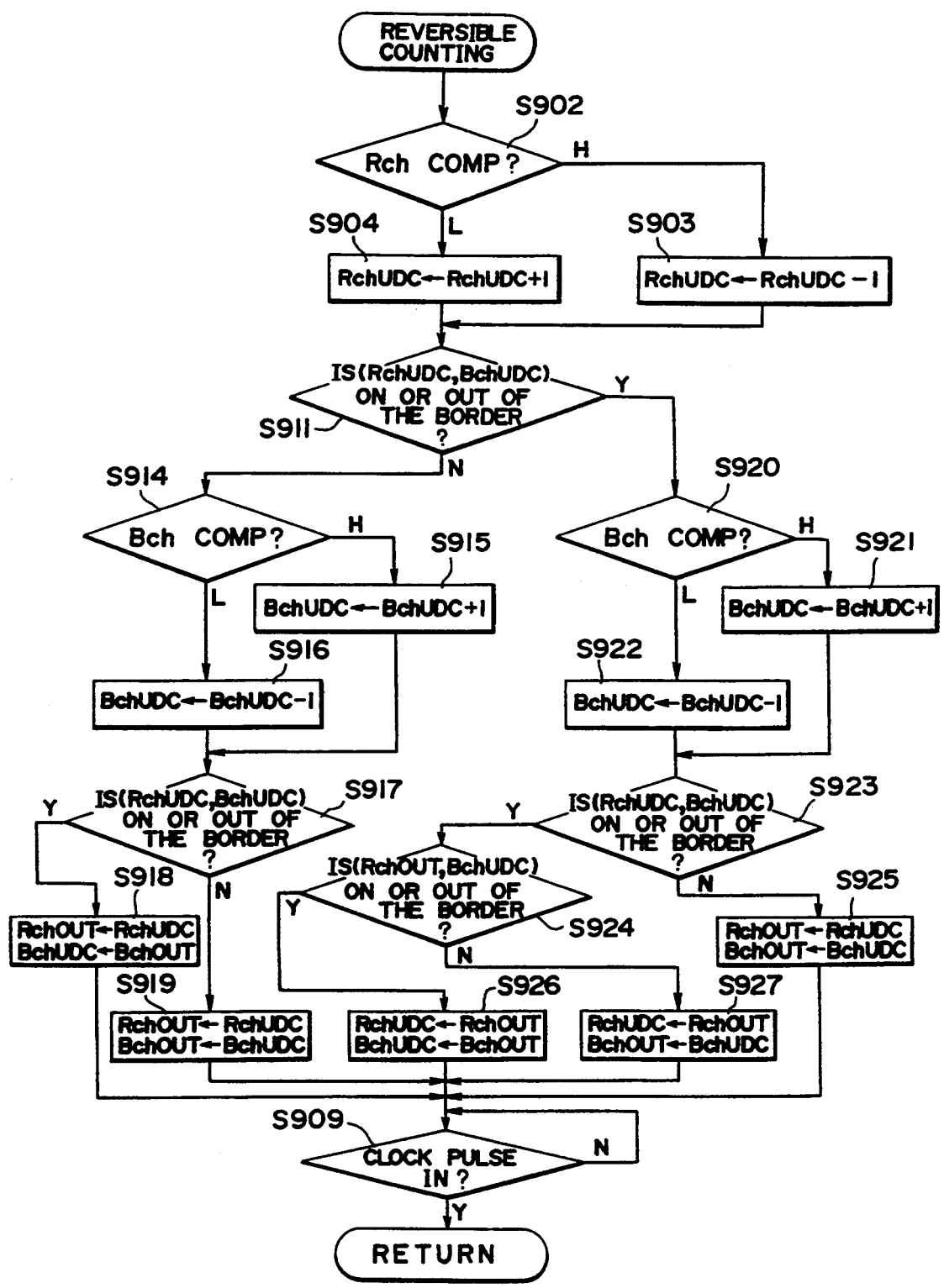
FIG. 21 is a flow diagram showing an up-down counting routine among the operations of the microcomputer according to the eighth embodiment of this invention.

The contents of the step S954 i.e. the up-down counting would be as shown in FIG. 21, substantially the same as the operation represented by FIG. 2. Namely, the steps having the same lower two digits are the same in operation.

Further, in this embodiment, for extracting the amount of the high-frequency component, other means than the matrix and the filter, e.g. such a high-frequency component extracting means as included in a TTL type automatic focusing apparatus can be used. In this case, the change of the limiting area is preferably carried out at the completion of the focusing operation. Thus, the apparatus of this embodiment can be composed at a low cost by transferring components from apparatuses of other fields.

IX. NINTH EMBODIMENT

Figure 23:
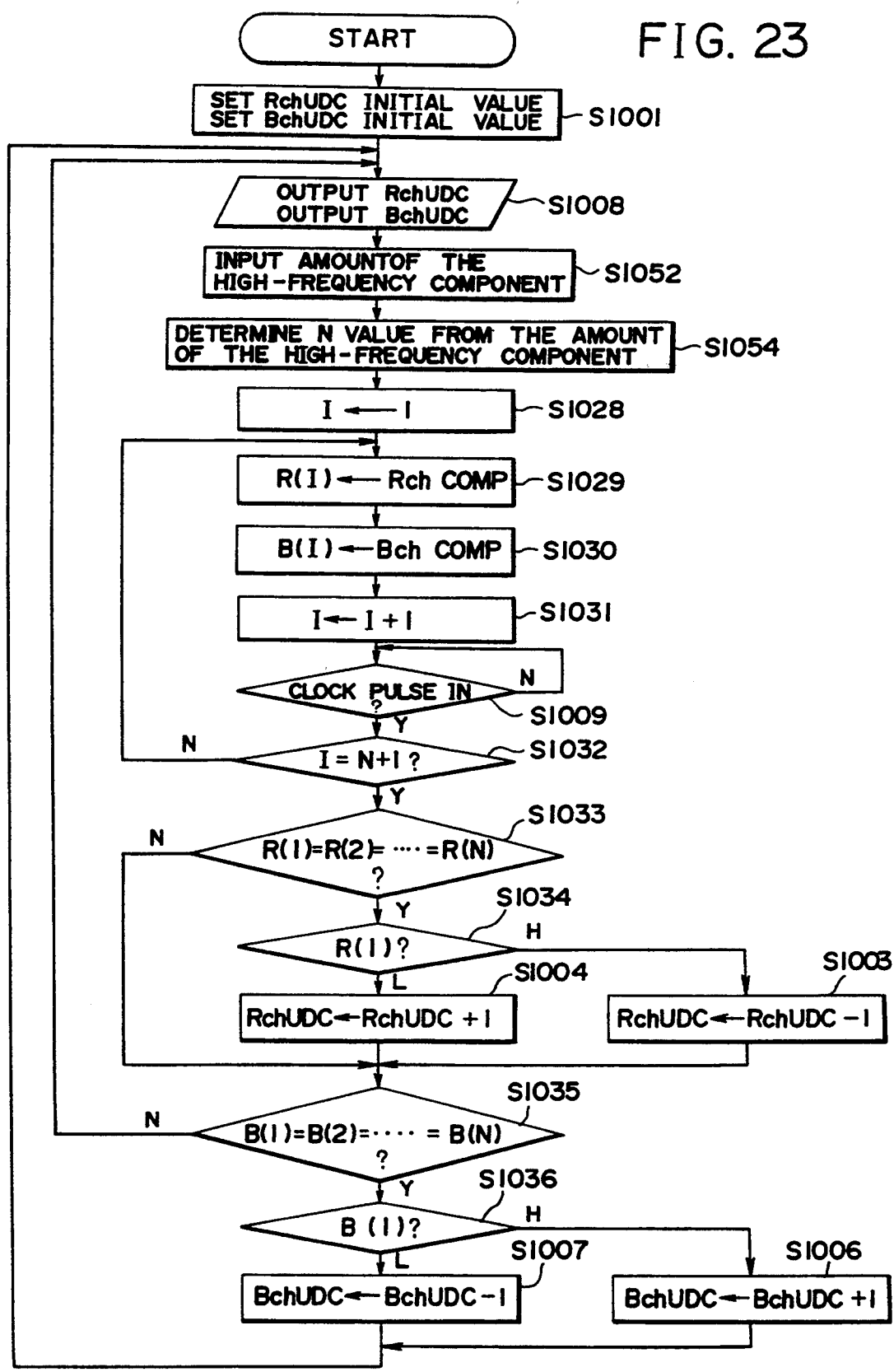
FIG. 23 is a flow diagram showing the operation of a microcomputer in an automatic white-balance controlling apparatus according to the ninth embodiment of this invention.
Figure 24:
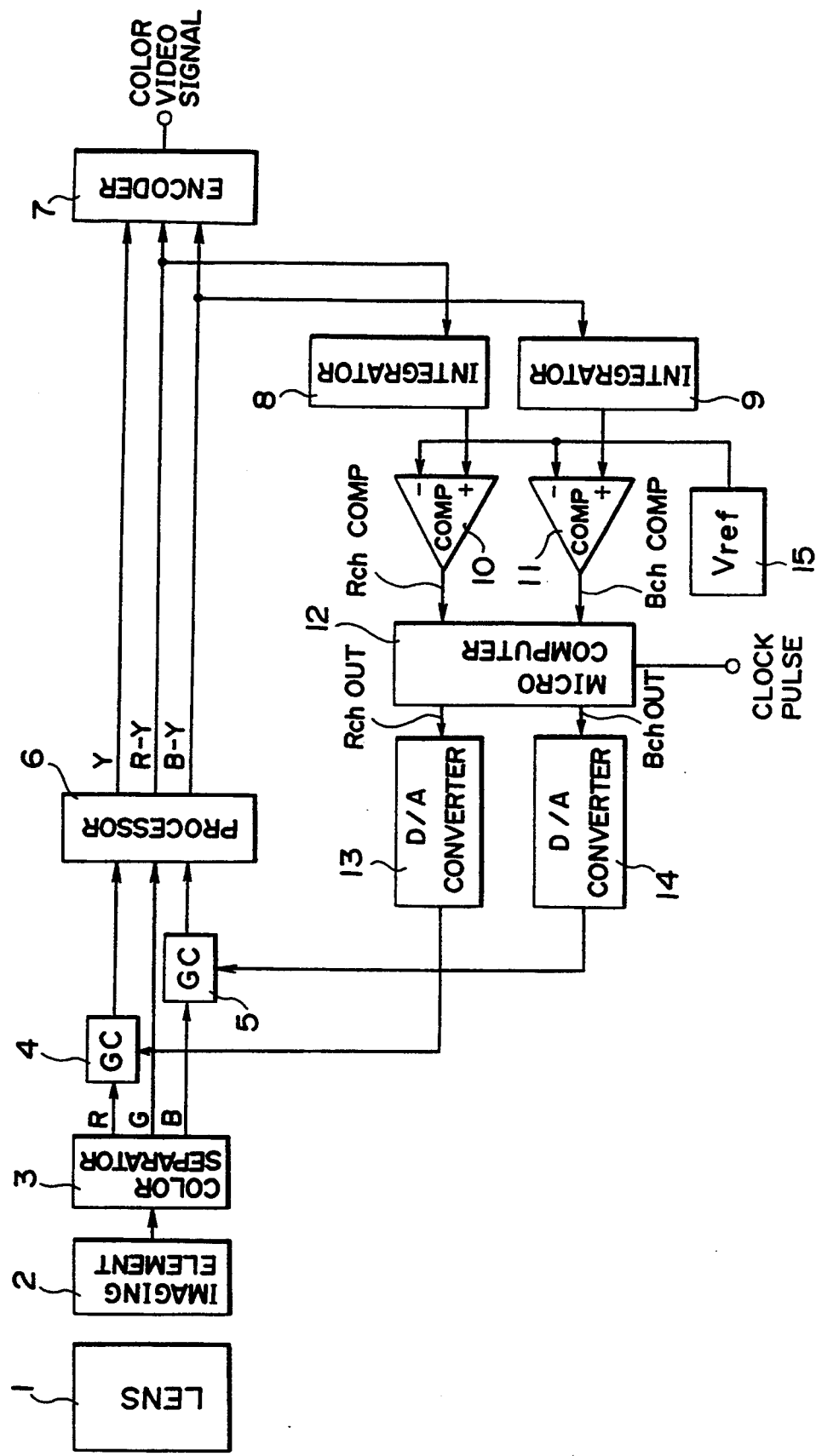
FIG. 24 is a block diagram showing a composition of a color imaging apparatus including a conventional automatic white-balance controlling apparatus.

FIG. 23 shows an operation of an automatic white-balance controlling apparatus according to the ninth embodiment of this invention, particularly the flow of the microcomputer. The composition of this apparatus is almost the same as that in the eighth embodiment, but the microcomputer operates as represented by FIG. 23. The operation shown in FIG. 23 is rather closer to the operation in FIG. 5. The steps shown in FIG. 23 operate in the same manner as the steps shown in FIGS. 5 and 21 having the same lower two digits.

In this embodiment, an amount of the high-frequency component is input after the outputs of the RchUDC and the BchUDC (S1052), and the value of N is determined in accordance with this amount (S1054). Accordingly, the white-balance controlling speed can be highly assured by decreasing the value of N when the amount of the high-frequency component is large, while it is reduced by increasing the same when the amount is small. This concept is based on the fact that the amount of the high-frequency component is typically large when the color temperature is high, requiring a high-speed white-balance controlling operation.

Accordingly, in this embodiment, it is possible to perform the white-balance controlling operation in accordance with the change of the object so as to prevent the deviation of the white-balance control.

What is claimed is:

1. An automatic white-balance controlling apparatus, comprising:
   (a) processing means for processing color input image signals to produce processed color difference signals;
   (b) integrating means for integrating two types of the processed color difference signals respectively, and outputting an integrated value for each color difference signal;
   (c) comparing means for comparing each of the integrated values obtained from the integrating means to a reference value representing an achromatic color to produce a compared result for each color difference signal;
   (d) means for repeatedly executing an up-down count for each of said color difference signals based on each compared result, respectively, for establishing a limited area in a two-dimensional space defined to represent two types of up-down count results in two dimensional spacial coordinates, for canceling the newest repeatedly executed counting operation with respect to at least one type of the up-down counting result, and for controlling gain levels of the color input image signals prior to processing, based on the up-down counting result; and
   (e) adjusting means for adjusting the gain levels of the color input image signals in accordance with the gain control from the control means so that a stable white balance controlled color video signal can be produced.

2. The automatic white-balance controlling apparatus of claim 1, further comprising:
   (a) means for selecting one of a chasing mode and a storing mode;
   (b) means for generating a trigger to maintain a white balance controlled state; and
   said control means establishing the limited area as a first limited area when the chasing mode is selected, and establishing the limited area as a second limited area when the storing mode is selected, the first limited area being included within the second limited area; and
   said control means executing the up-down counting only when the trigger is generated, when the storing mode is selected.

3. The automatic white-balance controlling apparatus of claim 1, further comprising:
   a high frequency component extracting means for extracting a high frequency component of a brightness signal from the color input image signals, said control means establishing the limited area to be larger when the high-frequency component is large and establishing the limited area to be narrower when the high-frequency component is small.

4. An automatic white-balance controlling apparatus comprising:
   (a) means for processing color input image signals to produce processed color difference signals;
   (b) integrating means for integrating two types of the processed color difference signals, and outputting an integrated value for each color difference signal;
   (c) comparing means for comparing each of the integrated values obtained from the integrating means to a reference value representing an achromatic color to produce a compared result for each color difference signal;
   (d) control means for repeatedly executing an up-down count for each of said color difference signals based on each compared result respectively, for storing compared result data from compared results for several events in a time series, for judging when the stored data are completely accorded with each of the color difference signals, and executing up-down counting only when judged to be in accordance, and for controlling gain levels of the color image signals based on the up-down counting result; and (e) adjusting means for adjusting the gain levels of the color input image signals in accordance with the gain control from the control means so that a stable white balance controlled color video signal can be produced.

5. The automatic white-balance controlling apparatus of claim 4, further comprising:

zoom position detecting means for detecting a zoom position of a lens through which the color image signals are input and a number of points to be stored in the time series in said control means being set in accordance with the detected zoom position.

6. The automatic white-balance controlling apparatus of claim 4, further comprising:

zooming position detecting means for detecting a zooming position of a lens through which the color image signals are input, and wherein a number of time-series storing points in the control means are set depending on the detected zooming position.

7. The automatic white-balance controlling apparatus of claim 4, wherein said control means stores a compared result at a time point preceding the compared result stored in the time series, judges if the compared result stored in the time series has been changed in view of the compared result at the preceding time point, increases the number of storage time points in series when there is any judged change, and decreases the number of storage time points when judged unchanged.

8. The automatic white-color balance controlling apparatus of claim 4, further comprising:

level controlling means for variably adjusting the gain level of an input color image, and wherein the number of storage time points in time series of the control means is set through said level controlling means.

9. The automatic white-color balance controlling apparatus of claim 8, further comprising:

high-frequency component extracting means for extracting a high-frequency component of a brightness signal from the color input image signals, wherein the number of the storage time points in time series of said control means is set through said level controlling means.

* * * * *